US010400758B2

(12) United States Patent
Bei et al.

(10) Patent No.: US 10,400,758 B2
(45) Date of Patent: Sep. 3, 2019

(54) BRUSHLESS PUMP MOTOR SYSTEM

(71) Applicant: SZ DJI TECHNOLOGY Co., Ltd, Shenzhen (CN)

(72) Inventors: Shimeng Bei, Shenzhen (CN); Xumin Wu, Shenzhen (CN); Jiyuan Ao, Shenzhen (CN); Yijun Guan, Shenzhen (CN); Xiaolong Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 37 days.

(21) Appl. No.: 15/241,667

(22) Filed: Aug. 19, 2016

(65) Prior Publication Data

US 2017/0152843 A1  Jun. 1, 2017

Related U.S. Application Data

(63) Continuation of application No. PCT/CN2015/080530, filed on Jun. 1, 2015.

(51) Int. Cl.
| | |
|---|---|
| B64D 1/18 | (2006.01) |
| F04B 43/00 | (2006.01) |
| B64C 39/02 | (2006.01) |
| F04D 15/00 | (2006.01) |
| F04B 43/04 | (2006.01) |
| F04B 49/06 | (2006.01) |
| F04B 49/10 | (2006.01) |

(52) U.S. Cl.
CPC ........ *F04B 43/0081* (2013.01); *B64C 39/024* (2013.01); *B64D 1/18* (2013.01); *F04B 43/04* (2013.01); *F04B 49/065* (2013.01); *F04B 49/103* (2013.01); *F04D 15/0066* (2013.01); *F04B 2203/0209* (2013.01)

(58) Field of Classification Search
CPC ...... F04B 43/008; F04B 43/04; F04B 49/065; F04B 49/103; F04B 2203/0209; B64C 39/024; B64D 1/18; F04D 15/0066
USPC ............................................ 239/214.21, 171
See application file for complete search history.

(56) References Cited

U.S. PATENT DOCUMENTS 2,043,262 A * 6/1936 Oglesby .................. B64D 1/16
244/136
3,008,376 A * 11/1961 Brunow ................... B64D 1/04
244/137.1

(Continued)

FOREIGN PATENT DOCUMENTS

| CN | 2360629 Y | 1/2000 |
| CN | 1428511 A | 7/2003 |

(Continued)

OTHER PUBLICATIONS

English translation (Abstract and Specification) of CN203652111 of Yang et al. (IDS provided by the Applicant on Aug. 31, 2016).*

(Continued)

*Primary Examiner* — Chee-Chong Lee
(74) *Attorney, Agent, or Firm* — Anova Law Group, PLLC

(57) ABSTRACT

Systems and methods can control a pumping system. Operating characteristics of a driving apparatus are obtained. The driving apparatus is operatively coupled to a pump and operates to effect operation of the pump. Additionally, instructions are provided to an electronic speed controller. In particular, the instructions direct the electronic speed controller to control activity of the driving apparatus.

20 Claims, 18 Drawing Sheets

(56) References Cited

U.S. PATENT DOCUMENTS

| | | | | |
|---|---|---|---|---|
| 3,220,482 | A | * | 11/1965 | Eveleth ................ A62C 3/0242 |
| | | | | 141/21 |
| 3,428,276 | A | * | 2/1969 | Hubbard ................ B64D 1/16 |
| | | | | 169/53 |
| 3,463,398 | A | * | 8/1969 | Smith et al. ........... A01C 17/00 |
| | | | | 222/334 |
| 3,682,418 | A | * | 8/1972 | Harter .................... B64D 1/16 |
| | | | | 244/136 |
| 3,936,018 | A | | 2/1976 | Barlow |
| 4,467,657 | A | | 8/1984 | Olsson |
| 5,096,390 | A | * | 3/1992 | Sevrain ................ F04C 15/008 |
| | | | | 310/104 |
| 6,285,938 | B1 | | 9/2001 | Lang et al. |
| 2009/0112372 | A1 | | 4/2009 | Peterson |
| 2012/0241533 | A1 | | 9/2012 | Moeller et al. |
| 2013/0320106 | A1 | | 12/2013 | Schmidt |

FOREIGN PATENT DOCUMENTS

| | | | |
|---|---|---|---|
| CN | 2814474 Y | | 9/2006 |
| CN | 101356373 A | | 1/2009 |
| CN | 101963806 A | | 2/2011 |
| CN | 102591302 A | | 7/2012 |
| CN | 102635537 A | | 8/2012 |
| CN | 102749926 A | | 10/2012 |
| CN | 102865892 A | | 1/2013 |
| CN | 103803083 A | | 5/2014 |
| CN | 203598980 U | | 5/2014 |
| CN | 203652111 U | | 6/2014 |
| CN | 104069970 A | | 10/2014 |
| CN | 104309809 | * | 1/2015 ............. B64D 27/24 |
| EP | 2564696 A1 | | 3/2013 |
| GB | 1405131 A | | 9/1975 |
| WO | WO 2006/057957 A2 | | 6/2006 |
| WO | WO 2007/061956 A2 | | 5/2007 |
| WO | WO 2013/130497 A1 | | 9/2013 |
| WO | WO 2014/028435 A1 | | 2/2014 |

OTHER PUBLICATIONS

Huang S., Farm unmanned helicopter, English translation (Abstract and Specification) of CN104309809 of Huang, Jan. 2015. (Year: 2015).*

U.S. Appl. No. 15/241,715, filed Aug. 19, 2016, Wu et al.

International search report and written opinion dated Feb. 24, 2016 for PCT/CN2015/080530.

International search report and written opinion dated Mar. 7, 2016 for PCT/CN2015/080531.

* cited by examiner

BRUSHLESS PUMP MOTOR SYSTEM

CROSS-REFERENCE

This application is a continuation of PCT application number PCT/CN2015/080530, filed Jun. 1, 2015, the entire contents of which are incorporated herein by reference.

BACKGROUND OF THE INVENTION

Agricultural spraying apparatus may be used to spread pesticide or fertilizer across crops. However, conventional agricultural spraying apparatus may utilize heavy, complicated equipment that is difficult to control. Additionally, it may be difficult to control the velocity and pressure of sprayed liquid when using conventional spraying apparatus. The drawbacks of such systems may prevent aerial systems from being efficiently used to provide pesticide and fertilizer to crop areas. For example, the lack of a mobile, efficient pumping system may keep agricultural spraying apparatus, such as those associated with aerial vehicles such as unmanned aerial vehicles (UAVs), from maximizing their use as aerial spraying apparatus.

SUMMARY OF THE INVENTION

Systems and methods are provided for spraying pesticide and fertilizer to agricultural areas using an efficient pumping system. As such, systems and methods are related to pumping systems, including pumping systems that are used in agricultural systems.

By providing more efficient pumping systems, the present disclosure may be used to improve agricultural spraying apparatus, such as those associated with aerial vehicles such as unmanned aerial vehicles (UAVs). The use of agricultural UAVs allow for spraying operations to be controlled by a ground remote controller or a global positioning service (GPS) signal. An agricultural UAV can be used to spray pesticide, seeds, powders, etc. Additionally, an agricultural UAV can operate at a low altitude with less drifting, and the UAV can hover without the need for dedicated airport. Further, the downward airflow generated by the rotors may facilitate a penetrating of the sprayed substance; therefore, the spraying effect is improved. Since the agricultural UAV can be operated over a long distance and the operator may not be exposed to the pesticide, a safety in spraying operation may be improved. Furthermore, at least 50 percent of the pesticide and 90 percent of water may be saved by using an UAV spraying technology. As such, it is beneficial to provide improvements to a pumping system of an agricultural UAV to make its use more efficient.

An aspect of the invention may include a controlled pumping system. The pumping system may comprise a pump. Additionally, the pumping system may comprise a driving apparatus that is operatively coupled to the pump and operates to effect operation of the pump. The pumping system may also comprise an electronic speed controller that controls the driving apparatus based on calculated operating characteristics of the driving apparatus.

Aspects of the invention may further include a method of controlling a pumping system. The method may comprise obtaining operating characteristics of a driving apparatus. The driving apparatus may be operatively coupled to a pump and operate to effect the pump. Additionally, the method may comprise providing instructions to an electronic speed controller. In particular, the instructions may direct the electronic speed controller to control activity of the driving apparatus. In examples, the instructions may be used to direct the electronic speed controller to engage the driving apparatus. When the driving apparatus engages the pump, the pump transmits fluid from a fluid reservoir to nozzles of the spraying apparatus. The electronic speed controller may also initiate movement of the driving apparatus. In particular, the electronic speed controller may initiate movement of the driving apparatus within a threshold amount of time. The electronic speed controller may also control a speed of a driving apparatus. The electronic speed controller may also halt movement of the driving apparatus. The electronic speed controller may also control precision of the driving apparatus.

Additional aspects of the invention may include an unmanned aerial vehicle (UAV) having a pumping system. The vehicle may comprise a housing forming a central body of the UAV. The vehicle may also comprise a pumping system that is mounted to the central body of the UAV. The pumping system may comprise a pump and a brushless motor. In particular, the brushless motor may be operatively coupled to the pump and operate to effect operation of the pump.

Further aspects of the invention may include a method of supporting a UAV having a pumping system. The method may comprise providing a housing forming a central body of the UAV. The method may also comprise providing a pumping system that is mounted to the central body of the UAV. The pumping system may comprise a pump and a brushless motor. Additionally, the brushless motor may be operatively coupled to the pump and operate to effect operation of the pump.

Additionally aspects of the invention may include a method of supporting a pumping system of a UAV. The method may comprise mounting a pumping system to a housing, which forms a central body of the UAV. The pumping system may comprise a pump and a brushless motor. The brushless motor may be operatively coupled to the pump. Additionally, the method may comprise adapting the brushless motor to effect operations of the pump.

The aspects of the invention may also include a controlled pumping system. The pumping system may comprise a pump that is operably coupled to a motor. Additionally, the pumping system may comprise a motor speed controller. The motor speed controller may control the motor to generate a first rotational energy having a first torque component and a first speed component. Additionally, the pumping system may include a speed adjusting apparatus that is operatively coupled to the motor and the pump. The speed adjusting apparatus may convert the first rotational energy to a second rotational energy having a second torque component and a second speed component. Additionally, the second rotational energy may be provided to the pump.

Further aspects of the invention may include a method of controlling a pumping system. The method may comprise generating a first rotational energy at a motor. The first rotational energy may have a first torque component and a first speed component. Additionally, the first rotational energy that is produced by the motor may be controlled by a motor speed controller. The method may also comprise converting the first rotational energy to a second rotational energy using a speed adjusting apparatus. The second rotational energy may have a second torque component and a second speed component. Additionally, the method may comprise providing the second rotational energy to the pump.

It shall be understood that different aspects of the invention can be appreciated individually, collectively, or in combination with each other. Various aspects of the invention described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

DETAILED DESCRIPTION OF THE INVENTION

Figure 1:
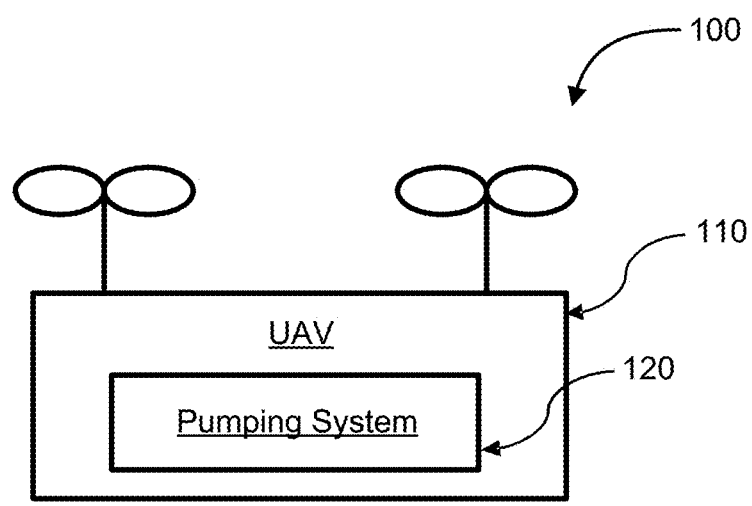
FIG. 1 illustrates a schematic of a pumping system within an unmanned aerial vehicle (UAV), in accordance with embodiments of the invention.
Figure 2:
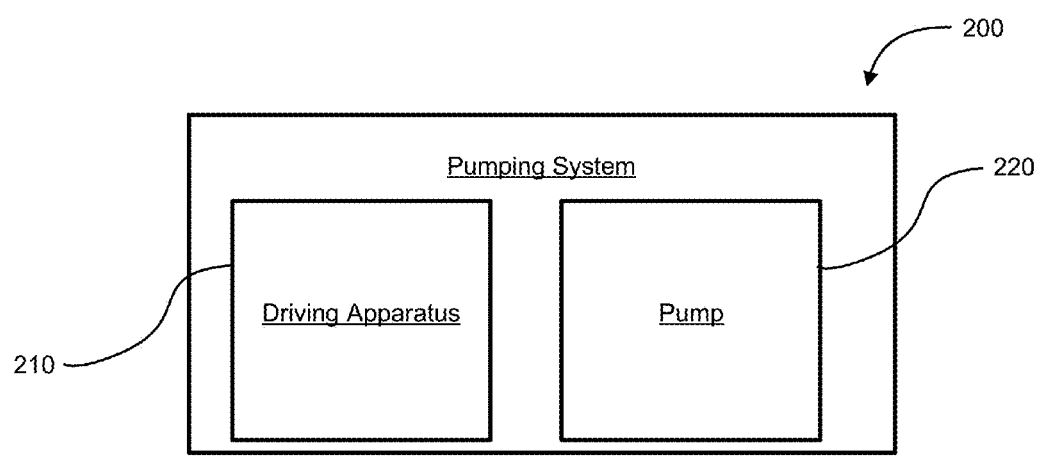
FIG. 2 illustrates a schematic of a pumping system having a driving apparatus and pump, in accordance with embodiments of the invention.

The invention provides systems, methods, and devices for delivering a material, medium, and/or product to an area, using a pumping system. For example, diaphragm pumps can be used in agricultural unmanned aerial vehicles (UAVs) for pumping out pesticides or fertilizer from a fluid reservoir to a spraying apparatus. In particular, the diaphragm pump may be used to transmit the spraying fluid to one or more fluid outlets of the spraying apparatus. When using a diaphragm pump to transmit fluid through a spraying apparatus, however, the velocity and pressure conditions of the diaphragm pump may significantly affect the effect of the spraying fluid within the spraying apparatus. Unfortunately, it is difficult to control the pressure and flow amount within a diaphragm pump. Additionally, conventional diaphragm pumps, which are driven by brush motors, may have a short service time. Brush motors may also be heavy and occupy a large volume within a UAV.

The pumping system may be on-board an unmanned aerial vehicle (UAV). The delivery systems, methods, and devices may allow for spraying agricultural material, medium, and/or products to agricultural areas using an efficient pumping system. A UAV can be employed in an agricultural environment to deliver one or more agricultural material, medium, and/or products to land in which crops are growing. Agricultural material, medium, and/or products can include water, pesticides, fertilizer, seeds, engineered dirt, compost, or any other product configured to produce or aid in production of one or more plant species. The material, medium, and/or product may be in a fluid form, such as a liquid or gaseous product. The product may be a solid product, such as particulates or powders. The product may be any combination of fluid and solid products. The UAV may have a storage container, the pumping system, and an outlet. The pumping system may be a delivery assembly that conveys product from the storage to the outlet. The storage container may store the product, and the pumping system may deliver the product from the storage container to the outlet. In particular, a pumping system may include an electronic speed controller, a driving apparatus such as a brushless motor, a speed adjusting apparatus, or a combination thereof. The driving apparatus may be operably coupled to a pump and may effect operation of the pump. The electronic speed controller may control a speed of the driving apparatus. The UAV may have a housing within which one or components of the pumping system may be disposed.

By utilizing an electronic speed controller, the amount of spraying fluid that flows through the pumping system may be precisely controlled. A driving apparatus response time may also be shortened when an electronic speed controller is used. This response time may be shorter when the electronic speed controller is used to adjust the speed of a driving apparatus compared to manually adjusting the speed of a driving apparatus. In particular, the use of an electronic speed controller to adjust the speed of a driving apparatus may be 1%, 2%, 3%, 4%, 5%, 6%, 7%, 8%, 9%, or 10%, 12%, 15%, 20%, 25%, 30%, 35%, 40%, 45%, 50%, 55%, 60%, 65%, 70%, 75%, 80%, 90%, 100%, 200%, 500%, or greater than 500% faster than when the speed of a driving apparatus is manually changed. Additionally, different types of electronic speed controllers may be used to control the pumping system. For instance, an electronic speed controller that is based on a field oriented control may be used to control a driving apparatus of the pumping system. In particular, the use of a field oriented control electronic speed controller may be used to start and stop the driving apparatus quickly. Additionally, the flow response may be easily adjusted using the electronic speed controller, and may be adjusted with a fast response time. For example, using the electronic speed controller, a pumping system may have an emergency stop function that allows the pump to be stopped quickly. In particular, the pumping system may have an emergency stop function that allows the pump to be stopped within 0.01 seconds, 0.05 seconds, 0.1 seconds, 0.2 seconds, 0.3 seconds, 0.4 seconds, 0.5 seconds, 0.6 seconds, 0.7 seconds, 0.8 seconds, 0.9 seconds, 1 seconds, 2 seconds, 3 seconds, 4 seconds, 5 seconds, 6 seconds, 7 seconds, 8 seconds, 9 seconds, 10 seconds, 15 seconds, 20 seconds, 25 seconds, 30 seconds, 35 seconds, 40 seconds, 45 seconds, 50 seconds, 55 seconds, 60 seconds, 90 seconds, 120 seconds, 5 minutes, or 10 minutes.

By utilizing a brushless motor as the driving apparatus in a pumping system, the service time of the driving apparatus may be longer than a service time that is associated with the use of a brush motor. In particular, when conventional brush motors are used in pumping systems, the service time of a carbon brush is short. The short service time of a brush motor is generally associated with wear and tear of the brush components, whereas a brushless motor does not have brush components that wear easily. Additionally, by using a brushless motor rather than a brush motor, the weight of the pumping system may be greatly reduced. For instance, the weight of the pumping system may be reduced by 50%. When a brushless motor is used in a pumping system, the overall volume of the pumping system may also be smaller. As such, pumping systems that utilize a brushless motor may be more compact and easier to fit within carrying holders, such as those used by individuals to hold personalized spraying apparatus, and also easier to fit within aerial vehicles, such as UAVs.

A pumping system may include a driving apparatus and a pump. The driving apparatus may produce a first rotational energy having a speed component and a torque component. However, some driving components may not produce rotation energy that is adapted to a pump in the pumping system. In order to integrate a driving apparatus with a pump in a pumping system, a speed adjusting apparatus may be used. In particular, by utilizing a speed adjusting apparatus, the rotational energy produced by a driving apparatus may be adapted to meet the input requirements of a pump. This may advantageously permit a pump to be operated with a broad range of driving apparatus with which the pump may not otherwise be compatible. For example, a particular pump may not be compatible with a motor that generates rotational energy having a high torque component and a high speed component, as the pump may not be able to adapt to the high speed. As such, a speed adjusting apparatus may be used to reduce the speed such that the pump may still utilize, and benefit from, the rotational energy having a high torque component that is generated by the motor. When using a speed adjusting apparatus, the speed component of rotational energy that is produced by the driving apparatus may be increased or decreased.

Additionally, the pumping system may be operatively coupled to an outlet system. The outlet system may be a spraying apparatus. In particular, the spraying apparatus may be used for spraying product, such as agricultural product, like pesticides or fertilizer. Any description herein of pesticides, fertilizer, or other product, may apply to any type of product or agricultural product. Pumping systems that are used with spraying apparatus may be used by individuals spraying pesticides or fertilizer in a field. In particular, the pumping system may be coupled with the spraying apparatus within a holder which may then be carried by a farmer who is tending to his field. A holder may comprise a portable or hand-held apparatus that is adapted to hold a spraying apparatus. For example, the holder may be a bag, a backpack, or another form of carrying device or vehicle. Alternatively, pumping systems that are coupled with spraying apparatus may be used in an agricultural unmanned aerial vehicle (UAV) for pumping out pesticides or fertilizer from the spraying apparatus.

Examples of efficient pumping system are provided, as illustrated in figures below. FIG. 1 illustrates a schematic of an unmanned aerial vehicle (UAV) 100 with an on-board pumping system 120, in accordance with embodiments of the invention. The UAV may have a housing 110.

The UAV 100 may be configured to operate, e.g. fly, in response to a signal from a remote terminal. The UAV may respond to manual instructions provided by a user via the remote terminal. The UAV may be configured to operate autonomously or semi-autonomously. The UAV may be capable of flying autonomously in accordance with instructions from one or more processors without requiring input from a user.

The UAV may be capable of flight with aid of one or more propulsion units on-board the UAV. The propulsion units may include one or more rotors driven by one or more actuators. The rotors may include one or more rotor blades that may generate lift for the UAV. The rotor blades may rotate to generate lift for the UAV. In some embodiments, the UAV may include multiple propulsion units (e.g., two or more, three or more, four or more, five or more, six or more, seven or more, eight or more, nine or more, or ten or more propulsion units). The propulsion units may be capable of generating lift for the UAV. The propulsion units may operate in accordance with a flight control unit. The flight control unit may be on-board the UAV. The flight control unit may generate signals to control the propulsion units in accordance with signals from a remote terminal. The UAV may be capable of taking off and/or landing vertically with aid of the one or more propulsion units.

The UAV may comprise a central body. One or more arms may extend from the central body. In some embodiments, the arms may extend radially from the body. The arms may extend symmetrically from the UAV. The UAV may have two halves that may mirror one another. The arms may be radially symmetric from one another. The arms may or may not be equally spaced apart from one another. The one or more propulsion units may be supported by the one or more arms of the UAV. For instance, the one or more propulsion units may be attached to the arms of the UAV. The one or more propulsion units may be attached at or near the end of the arms of the UAV. The one or more propulsion units may be positioned within 50%, 40%, 30%, 25%, 20%, 15%, 10%, 5%, 3%, 1%, or 0.5% of the end of the arms, along the length of the arm.

The UAV may have a housing 110. The housing may partially or completely enclose one or more components of the UAV. The housing may form the central body. The housing may form an enclosure of the central body. The housing may or may not form the arms or a portion of the arms. The housing may or may not form an enclosure of the arms. In some embodiments, the arms may be separably attached to the central body. Alternatively, the arms may be affixed to the central body, or may be integrally formed with the central body. A housing may be formed of a single piece or multiple pieces. The housing may form a single integral piece for the central body and/or the arms. Alternatively, the housing may be a single integral piece for the central body while the arms are formed from separate pieces. In some instances, the housing may be formed as multiple pieces for the central body. The housing may be formed as multiple pieces for the central body and the arms. In some instances, the housing may form a shell or cover that may enclose one or more components.

The housing may define an interior space or cavity. The interior space or cavity may contain one or more electrical components of the UAV. For example, the flight control unit may be provided within the interior space or cavity of the housing. Other examples of components that may be within the interior cavity may include sensors, navigation units (e.g., global positioning system (GPS), inertial measurement unit (IMU), communication units (e.g., for direct or indirect forms of communication), image processing units, payload data or control units, power control units, or any other type of components. For instance, a power source that may power the UAV may be provided within an interior space or cavity. The housing may encompass or enclose one or more of these components.

The UAV may comprise one or more sensors to determine the temperature or pressure of the UAV. The UAV may further comprise other sensors that may be used to determine a location of the UAV, such as global positioning system (GPS) sensors, inertial sensors which may be used as part of or separately from an inertial measurement unit (IMU) (e.g., accelerometers, gyroscopes, magnetometers), lidar, ultrasonic sensors, acoustic sensors, WiFi sensors. The UAV can have sensors on board the UAV that collect information directly from an environment without contacting an additional component off board the UAV for additional information or processing. For example, a sensor that collects data directly in an environment can be a vision or audio sensor. Alternatively, the UAV can have sensors that are on board the UAV but contact one or more components off board the UAV to collect data about an environment. For example, a sensor that contacts a component off board the UAV to collect data about an environment may be a GPS sensor or another sensor that relies on connection to a another device, such as a satellite, tower, router, server, or other external device. Various examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). The sensors onboard or off board the UAV may collect information such as location of the UAV, location of other objects, orientation of the UAV, or environmental information. A single sensor may be able to collect a complete set of information in an environment or a group of sensors may work together to collect a complete set of information in an environment. Sensors may be used for mapping of a location, navigation between locations, detection of obstacles, detection of a target, or measurement of barometric pressure.

The UAV may include an on-board pumping system 120. The UAV may support the weight of the on-board pumping system while the UAV is in flight. The UAV may support the weight of the on-board pumping system while the UAV is landed. The pumping system may include a fluid reservoir, one or more outlets, and an assembly for controlling flow of fluid from the fluid reservoir to the one or more outlets. The fluid may include a liquid or a gaseous fluid. In some embodiments, the fluid may include particles therein. For instance, the gaseous fluid may include powder or other particles that may be with the gaseous fluid. Any description herein of fluid handled by the pumping system may also apply to any particulates, powders, or other solid substances that may be handled by the pumping system. The pumping system may be attached to the UAV.

For instance, the pumping system may be mounted within the UAV, such as within a housing of the UAV. The pumping system may be within a space or cavity formed by the housing. In some instances, at least as portion of the pumping system may be within the housing. Optionally, a portion or all of the pumping system may be outside the housing of the UAV. In some instances, a portion of the pumping system may be within a housing of the UAV while a portion of the pumping system may be outside the housing of the UAV. For example, a fluid reservoir may be provided within a housing of the UAV while the one or more outlets may be provided outside the UAV. In some instances, a fluid reservoir and a fluid control assembly may be within the housing of the UAV while all or a portion of the outlet may protrude from the housing. In other instances, a fluid reservoir may be within the housing while the fluid control assembly and at least a portion of the outlet is outside the housing. In some instances, the fluid reservoir, the fluid control assembly, and at least a portion of the outlet may be outside the housing. Optionally, the fluid reservoir and at least a portion of the outlet may be outside the housing while the fluid control assembly is within the housing. Any combination of components of the pumping system may be provided within the housing, outside the housing, or both inside and outside the housing.

In some implementations, the pumping system may be attached to an internal wall of the housing of the UAV. The pumping system may be attached to an interior surface of the housing. The pumping system may be attached to a floor, side-wall, or ceiling of the housing. Any of the components of the housing system may be attached to an internal wall of the housing. The pumping system, or any components thereof, may be arranged on the UAV so that the components of the UAV remain fixed relative to the UAV. Alternatively, the pumping system may be externally mounted to the UAV. One or more components of the pumping system may be mounted externally to the UAV. Any description herein of a pumping system may apply to any individual components of the pumping system as described anywhere herein.

When the pumping system is within the housing, the pumping system may be shielded from an external environment. The pumping system may be at least partially shielded from wind, dust, or precipitation. When the pumping system is outside the housing, the pumping system may or may not be shielded from the external environment. In some embodiments, an external cover may cover a portion of the pumping system. Alternatively, the pumping system may be completely exposed to the external environment.

The pumping system may be mounted such that the center of gravity of the pumping system is lower than the center of gravity of the UAV as a whole. The pumping system may be mounted such that the center of gravity of the pumping system is within a central region of the UAV. The pumping system may be mounted so that the center of gravity of the pumping system is not too offset to the side. The pumping system may be arranged so that it is laterally within about equal to or less than 50%, 40%, 30%, 20%, 10%, 5%, 3%, or 1% of a center of the UAV.

The pumping system may operate while the UAV is flight. Operation of the pumping system may include delivery of fluid from a fluid reservoir to one or more outlets of the pumping system. For example, the pumping system may be coupled to a spraying apparatus. The spraying apparatus may be mounted to the UAV. The spraying apparatus may be attached within the UAV. The spraying apparatus may be supported by the central body of the UAV. The spraying apparatus may be supported by a landing stand. The spraying apparatus may be between a landing stand when a UAV is resting on a surface.

In this example, the pumping system may deliver fluid from the fluid reservoir to the spraying apparatus. The fluid may be sprayed from the one or more outlets of the spraying apparatus. Thus, fluid may be sprayed from the UAV while the UAV is in flight. The pumping system may operate while the UAV is landed. The pumping system may optionally be prevented from operating while the UAV is landed. The pumping system may be able to operate only while the UAV is flight. The pumping system may automatically start operating while the UAV is in flight. The pumping system may automatically start operating when the UAV reaches a predetermined altitude. Alternatively, the pumping system may operate in response to a user command to operate. The user command to operate may be delivered with aid of a remote terminal.

The pumping system may operate with aid of a power source of the pumping system. The power source of the pumping system may or may not be the same as a power source that powers one or more propulsion units of the UAV. The power source of the pumping system may or may not be the same as a power source that powers one or more electrical components of the UAV. The power source of the pumping system may be provided within a housing of the UAV. The power source of the pumping system may alternatively be provided outside the housing of the UAV.

A pumping system, such as the pumping system of FIG. 1, may include components such as a driving apparatus and a pump. Accordingly, FIG. 2 illustrates a schematic of a pumping system 200 having a driving apparatus 210 and pump 220, in accordance with embodiments of the invention.

The driving apparatus and pump of the pumping system may be within a housing. In particular, the driving apparatus and pump of the pumping system may be within a UAV. Alternatively, the driving apparatus and pump of the pumping system may be within a holder. A holder may comprise a portable or hand-held apparatus that is adapted to hold a spraying apparatus. For example, the holder may be a bag, a backpack, or another form of carrying device or vehicle. In examples, the driving apparatus and pump may be exposed to an external environment. In other examples, one or more components of the pumping system, including the driving apparatus and/or pump, may be exposed to an external environment.

The pump may be a device that moves a material, medium and/or product, such as agricultural product, by mechanical action. The pump may be a fluid pump that may move a liquid, gas, powder, or slurry by way of mechanical action. The pump may be a diaphragm pump, a pressure-based pump, a hydraulic pump, or another type of pump. During operation of the pump, pressure within the pump may build to a point where the spraying material may be expelled. Spraying material may be expelled as a result of positive pressure that is created using a pump. Spraying material may be a result of pressure from a pressurized reservoir. The spraying of material may be aided by the use of gravity. In examples, spraying material may be expelled using one or more mechanical features that push or distribute the material out.

An example of a pump that is used to expel material is seen in a diaphragm pump, which expands to hold material in a chamber before expelling the material. Accordingly, in examples, the pump may comprise a diaphragm pump. In particular, a diaphragm pump may be a volumetric pump that changes volume by reciprocating deformation of a diaphragm. Further, the pump may be an electric mini-diaphragm pump. Using an electric mini-diaphragm pump may significantly reduce the weight of a pumping system. Alternative pumps may also be used to effect the intake, transmittal, and expulsion of spraying material. In other examples, a pump may comprise a pressure-based pump or a hydraulic pump. In examples, a pump may comprise a pressure-based pump. In examples, a pump may comprise a hydraulic pump. In examples, the pump may comprise a piston pump. In examples, the pump may comprise a centrifuge pump.

The pump may have a volume of 1 cm³, 2 cm³, 5 cm³, 10 cm³, 15 cm³, 20 cm³, 25 cm³, 30 cm³, 35 cm³, 40 cm³, 45 cm³, 50 cm³, or greater than 50 cm³. The pump may have a weight of 0.01 kg, 0.05 kg, 0.1 kg, 0.2 kg, 0.3 kg, 0.4 kg, 0.5 kg, 0.6 kg, 0.7 kg, 0.8 kg, 0.9 kg, 1 kg, 1.5 kg, 2 kg, 3 kg, 4 kg, 5 kg, or more than 5 kg. Additionally, the pump may have a footprint of 1 cm², 2 cm², 5 cm², 10 cm², 15 cm², 20 cm², 25 cm², 30 cm², 35 cm², 40 cm², 45 cm², 50 cm², or greater than 50 cm². The pump may have a flow of 0.01 mL/min, 0.02 mL/min, 0.03 mL/min, 0.04 mL/min, 0.05 mL/min, 0.1 mL/min, 0.2 mL/min, 0.3 mL/min, 0.4 mL/min, 0.5 mL/min, 0.6 mL/min, 0.7 mL/min, 0.8 mL/min, 0.9 mL/min, 1 mL/min, 10 mL/min, 20 mL/min, 30 mL/min, 40 mL/min, 50 mL/min, 60 mL/min, 70 mL/min, 80 mL/min, 90 mL/min, 0.01 L/min, 0.2 L/min, 0.3 L/min, 0.4 L/min, 0.5 L/min, 1 L/min, 2 L/min, 3 L/min, or greater than 3 L/min.

The driving apparatus may be operatively connected to the pump. When the pump is a fixed volume, each rotation of a driving apparatus, such as a motor, may be associated with a particular volume of fluid that is pump out of the pump. This relationship may be used to calculate the amount of fluid that is processed by a pump based on the measured working current of the driving apparatus.

The driving apparatus may be physically coupled to the pump. Alternatively, the driving apparatus may be physically coupled to another component that is physically coupled to the pump. The driving apparatus may be directly or indirectly connected to the pump. For example, the driving apparatus may be coupled to a speed reducing apparatus. The speed reducing apparatus may be used to convert rotational energy that is provided by the driving apparatus to a rotational energy that is compatible with a pump.

The driving apparatus may be a motor. In particular, the driving apparatus may be a brush direct current motor, a brushless direct current motor, an alternating current induction motor, a permanent magnet synchronous motor, or another type of motor.

The driving apparatus may also operate to effect the operation of the pump. The driving apparatus may be operatively connected, or coupled, to the pump such that rotational energy produced by the driving apparatus is received at the pump. In particular, the rotational energy that is generated by the driving apparatus may be transmitted to the pump using a motor shaft. The rotational energy produced by the driving apparatus may be received at an offset piece of a pump. The offset piece of the pump may be a part of a piston assembly within the pump such that rotational energy that is received at the eccentric from the driving apparatus is used to engage the piston assembly of the pump. When the driving apparatus is initiated, the pump may also be initiated. In particular, the movement of the piston may cause the diaphragm of a diaphragm pump to expand so as to take in fluid. When the driving apparatus is accelerated, the pump may be accelerated. A proportional relationship may be provided between speed of the driving apparatus and speed of the pump. A directly linear proportional relationship may be provided. Alternatively, when the driving apparatus is accelerated, a speed adjusting apparatus may be used to reduce the speed component of the rotational energy generated by the driving apparatus so that the resulting rotational energy is compatible with the pump. When the driving apparatus is halted, the pump may also be halted. When the driving apparatus is halted, there may be a shutdown period during which the pump slows down to a stop.

In other examples, the driving apparatus and the pump may be able to operably disconnect such that the shutdown of the driving apparatus does not necessarily shutdown the pump. For example, if the driving apparatus shuts down, the pump may have a back-up driving apparatus such as a generator. Further, the pumping system may have settings where the pump is securely coupled to the driving apparatus, such that the halting of the driving apparatus necessarily halts a pump that is securely coupled to the driving apparatus. Additionally, the pump system may have settings where the pump is decouplable from the driving apparatus. When the pump is decouplable from the driving apparatus, the pump may be switched to a secondary driving apparatus if the first driving apparatus fails or stops suddenly.

In examples, the driving apparatus and the pump may form a single unit. The driving apparatus and pump may form a single unit by sharing a common housing. The driving apparatus and pump may be tightly coupled with one another. The driving apparatus and pump may share one or more components in common. The single unit may form a small unit. The single unit may have a volume of 2 cm³, 5 cm³, 10 cm³, 15 cm³, 20 cm³, 25 cm³, 30 cm³, 35 cm³, 40 cm³, 45 cm³, 50 cm³, or greater than 50 cm³. The single unit may have a weight of 0.01 kg, 0.05 kg, 0.1 kg, 0.2 kg, 0.3 kg, 0.4 kg, 0.5 kg, 0.6 kg, 0.7 kg, 0.8 kg, 0.9 kg, 1 kg, 1.5 kg, 2 kg, 3 kg, 4 kg, 5 kg, or more than 5 kg.

By forming the driving apparatus and the pump as a single unit, the pumping system may form a compact, mobile unit that may be carried by individuals. Alternatively, the pumping system 200 may be carried in a UAV, such as the UAV as provided in FIG. 1. In additional examples, the driving apparatus and the pump may be combined within a holder. A holder may comprise a portable or hand-held apparatus that is adapted to hold a spraying apparatus. For example, the holder may be a bag, a backpack, or another form of carrying device or vehicle. In examples, the driving apparatus and pump may be exposed to an external environment. The holder may be used for mobile transport of the pumping system. The holder may have straps attached so as to secure the holder to a body of the individual carrying the holder. The holder may have additional securing components that may be used to attach an auxiliary component, such as a spraying apparatus, that is coupled to the pumping system. As such, the holder may be used to carry a pumping system and a spraying apparatus for an individual to transport.

The driving apparatus may have a characteristic torque and rotating speed that satisfies the input requirements of the pump. For instance, an rpm of the driving apparatus may correspond to an rpm for the pump to function at a desired rate. The driving apparatus may optionally be directly coupled to the pump. The driving apparatus may also have a characteristic torque and rotating speed that is incompatible with input requirements of the pump so as to require a rotational energy conversion apparatus. For example, the driving apparatus may utilize a speed adjusting apparatus to reduce the speed component of rotational energy that is produced by the driving apparatus. In particular, the speed adjusting apparatus may reduce a speed component by using a gear mechanism to translate a high speed component into a lower speed component. In examples, the speed adjusting apparatus may reduce a speed component of a received rotational energy by 1%, 2%, 3%, 4%, 5%, 6%, 7%, 8%, 9%, or 10%, 12%, 15%, 20%, 25%, 30%, 35%, 40%, 45%, 50%, 55%, 60%, 65%, 70%, 75%, 80%, 90%, 92%, 94%, 96%, 97%, 98%, or greater than 98%. Alternatively, the speed adjusting apparatus may increase a speed component by using a gear mechanism to translate a low speed component into a high speed component. In examples, the speed adjusting apparatus may increase a speed component of a received rotational energy by 1%, 2%, 3%, 4%, 5%, 6%, 7%, 8%, 9%, or 10%, 12%, 15%, 20%, 25%, 30%, 35%, 40%, 45%, 50%, 55%, 60%, 65%, 70%, 75%, 80%, 90%, 100%, 200%, 500%, or greater than 500%. The speed adjusting apparatus may also adjust a speed component by using a belt component. Additionally, the speed adjusting apparatus may adjust a speed component by using a friction wheel.

In examples, the driving apparatus of the pumping system may comprise a motor. In particular, the driving apparatus may comprise a brushless motor. As discussed above, by utilizing a brushless motor as the driving apparatus in a pumping system 200, the service time of the driving apparatus may be longer. The brushless motor may comprise a type of electric motor that doesn't require a commutator. Examples of types of brushless motors may include brushless direct current motor, an alternating current induction motor, a permanent magnet synchronous motor. Additionally, by using a brushless motor rather than a brush motor, the weight of the pumping system may be greatly reduced. For instance, the weight of the pumping system may be reduced by 50%. The reduction of the weight may permit a UAV a longer flight time and an increased range when the UAV is carrying a reduced-weight pumping system. When a brushless motor is used in a pumping system, the overall volume of the pumping system may also be smaller. As such, pumping systems that utilize a brushless motor may be more compact and easier to fit within carrying holders, such as those used by individuals to hold personalized spraying apparatus, and also easier to fit within aerial vehicles, such as UAVs, such as the UAV in FIG. 1.

The pump in the pumping system may be used to transmit material from a reservoir and provide that material to a pump outlet. Material from the reservoir may include liquids, such as pesticides, fertilizer, and water. Materials in the reservoir may be pressurized. Alternatively, materials from the reservoir may not be pressurized. Material from the reservoir may include powder, such as fire extinguishing powder. The pump may be connected to a reservoir such that engaging the pump forms a vacuum at the fluid reservoir, which draws spraying material into the pump. The spraying material may then be transmitted through the pump to a pump outlet.

The pump outlet, in turn, may be connected to a distribution system. The distribution system may comprise a spraying apparatus. During operation of the pump, pressure within the pump may build to a point where the spraying material may be expelled. An example of this is seen in a diaphragm pump, which expands to hold material in a chamber before expelling the mater. Accordingly, in examples, the pump may comprise a diaphragm pump. In particular, a diaphragm pump may be a volumetric pump that changes volume by reciprocating deformation of a diaphragm. Further, the pump may be an electric mini-diaphragm pump. Using an electric mini-diaphragm pump may significantly reduce the weight of a pumping system. Alternative pumps may also be used to effect the intake, transmittal, and expulsion of spraying material. In other examples, a pump may comprise a pressure-based pump or a hydraulic pump.

A distribution system may not be limited to a spraying apparatus. Distribution systems may include systems that drip, pour, vaporize, or drop materials. Additionally, when a distribution system is a spraying apparatus, the distribution may have certain characteristics of spraying materials from the spraying apparatus. In particular, the distribution system may spray materials at an angle with respect to a vertical. For example, the distribution system may spray materials at an angle of 1°, 2°, 3°, 4°, 5°, 10°, 15°, 20°, 25°, 30°, 35°, 40°, 45°, 50°, 55°, 60°, 65°, 70°, 75°, 80°, 85°, 90°, 95°, 100°, 105°, 110°, 115°, 120°, 125°, 130°, 135°, 140°, 145°, 150°, 155°, 160°, 165°, 170°, 175°, 180°, or more than 180° from with respect to the vertical in either direction. Additionally, material that is sprayed may be sprayed in a stream of varying width. In particular, the width of a spray stream may be 0.01 cm, 0.05 cm, 0.1 cm, 0.2 cm, 0.3 cm, 0.4 cm, 0.5 cm, 0.6 cm, 0.7 cm, 0.8 cm, 0.9 cm, 1 cm, 2 cm, 3 cm, 4 cm, 5 cm, 6 cm, 7 cm, 8 cm, 9 cm, 10 cm, 15 cm, 20 cm, 25 cm, 50 cm, 1 m, 5 m, 10 m, 20 m, or greater than 20 m. Further, the material that is sprayed may be sprayed with a force of 0.01 N, 0.05 N, 0.1 N, 0.2 N, 0.3 N, 0.4 N, 0.5 N, 0.6 N, 0.7 N, 0.8 N, 0.9 N, 1 N, 2 N, 3 N, 4 N, 5 N, 6 N, 7 N, 8 N, 9 N, 10 N, 15 N, 20 N, 25 N, 50 N, or greater than 50 N. Additionally, a spraying apparatus can cover a large area of land. Depending on the height of the spraying apparatus from its target, the spraying apparatus may spray a land area of 1 $cm^2$, 2 $cm^2$, 5 $cm^2$, 10 $cm^2$, 15 $cm^2$, 20 $cm^2$, 25 $cm^2$, 30 $cm^2$, 35 $cm^2$, 40 $cm^2$, 45 $cm^2$, 50 $cm^2$, 75 $cm^2$, 1 $m^2$, 2 $m^2$, 3 $m^2$, 5 $m^2$, 10 $m^2$, 20 $m^2$, 50 m, 100 $m^2$, 200 $m^2$, 300 $m^2$, 500 $m^2$, or greater than 500 $m^2$.

Figure 3:
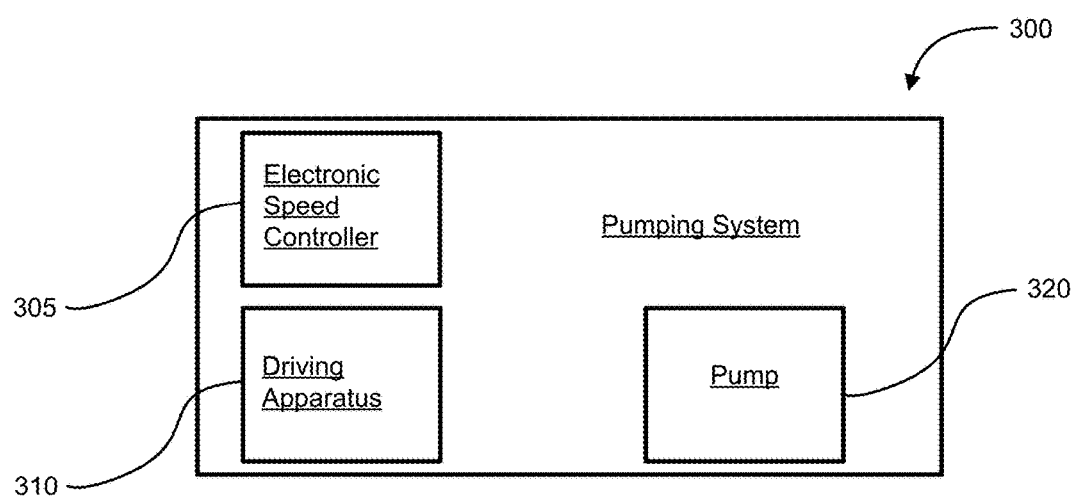
FIG. 3 illustrates a schematic of a pumping system having an electronic speed controller, a driving apparatus, and pump, in accordance with embodiments of the invention.
Figure 4:
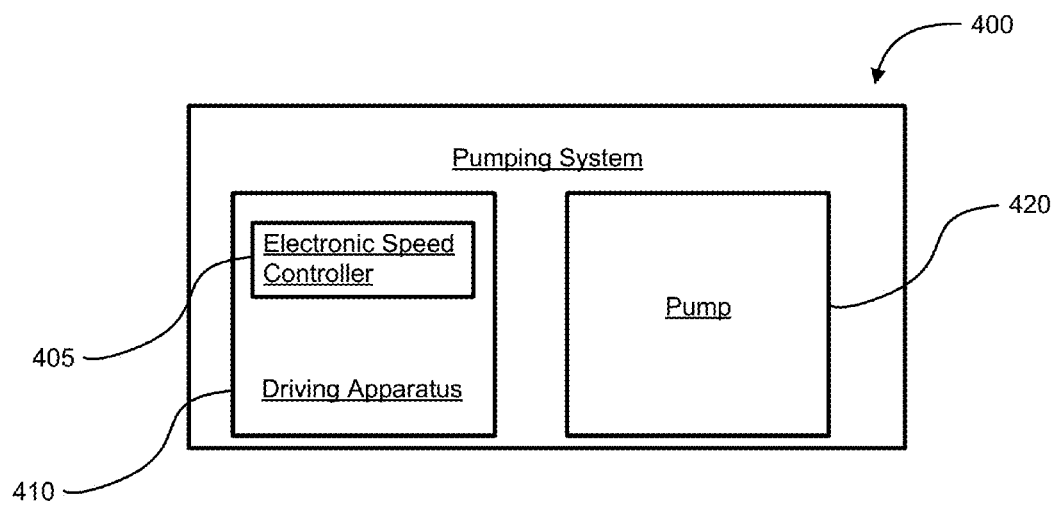
FIG. 4 illustrates a schematic of a pumping system having a pump and a driving apparatus with an integrated electronic speed controller, in accordance with embodiments of the invention.

In additional examples, an electronic speed controller may be used to control the operation of a pumping system. Accordingly, FIG. 3 illustrates a schematic of a pumping system 300 having an electronic speed controller 305, a driving apparatus 310, and pump 320, in accordance with embodiments of the invention. An electronic speed controller 305 may be used to vary the speed of driving apparatus 310.

The electronic speed controller may be attached to the pumping system. The electronic speed controller may be within the pumping system. The electronic speed controller may be within a housing that contains the pumping system. The electronic speed controller may be affixed to an interior cavity of a housing that contains the pumping system. The electronic speed controller may be attached to an exterior of a housing that contains the pumping system. In examples where the pumping system is within an unmanned aerial vehicle (UAV), the electronic speed controller may be attached to the interior of the UAV. Alternatively, the electronic speed controller may be attached to the exterior of the UAV. The electronic speed controller may be permanently affixed to the UAV. The electronic speed controller may be detachably affixed to the UAV.

The electronic speed controller may operate with aid of a power source of the electronic speed controller. The power source of the electronic speed controller may or may not be the same as a power source that powers the pumping system. The power source of the electronic speed controller may or may not be the same as a power source that powers the one or more propulsion units of a UAV having a housing that contains the pumping system. The power source of the electronic speed controller may or may not be the same as a power source that powers one or more electrical components of the UAV. The power source of the electronic speed controller may be provided within a housing of the pumping system. The power source of the electronic speed controller may be provided within a housing of the UAV. The power source of the pumping system may alternatively be provided outside the housing of the UAV.

The electronic speed controller may be used to control precision of the driving apparatus. In particular, the electronic speed controller may control the driving apparatus based on calculated operating characteristics of the driving apparatus. Operating characteristics of the driving apparatus that may be calculated include pump speed and working current In examples, the electronic speed controller may provide instructions to the driving apparatus based on the calculated working current. For example, the electronic speed controller may determine that the working current has fallen a significant amount. This determination may be associated with fluid in the pump that has fallen below a threshold level. Accordingly, if the electronic speed controller determines that the working current has fallen below a threshold level, the electronic speed controller may initiate a low fluid alert. Alternatively, if the electronic speed controller determines that the working current has fallen below a threshold level, the electronic speed controller may initiate a no fluid alert.

Responsiveness of the driving apparatus may be shorter when controlled by the electronic speed controller as compared to responsiveness of the driving apparatus 310 when not controlled by the electronic speed controller. The driving apparatus, in turn, may influence the amount of rotational energy that is provided to operate a pump. In this way, the electronic speed controller may influence the operation of the pumping system. By utilizing an electronic speed controller, the operation of the pump may be precisely controlled. Additionally, response time of a driving apparatus may also be shorter when an electronic speed controller is used.

The electronic speed controller may be controlled based on user input. The user input may be direct or may be preprogrammed. The electronic speed controller may be controlled based on a programmed pattern that is input by the user. The electronic speed controller may be controlled may be programmed to direct the driving apparatus based on sensed conditions. The conditions may be sensed based on input from sensors from the UAV. For example, the electronic speed controller may control the driving apparatus to expel spraying fluid at a higher velocity when a UAV is at an altitude above a threshold. Alternatively, the electronic speed controller may control the driving apparatus to expel spraying fluid at a lower velocity when a UAV is at an altitude below a threshold. Behavior of the electronic speed controller may be contingent on a UAV being in flight. In other examples, the electronic speed controller may be programmed to control a direction of expelling materials, may be programmed to halt spraying materials under certain conditions, may be programmed to turn on a spraying conditions based on certain conditions, and may be programmed to make decisions without direct user input.

The driving apparatus may comprise a brushless motor, as described above. In other examples, the driving apparatus may be a brush motor, an alternating current induction motor, or a permanent magnet synchronous motor. The driving apparatus may be a motor that satisfies the requirements of the pump. Alternatively, the driving apparatus may be a motor that is adaptable to satisfy the requirements of the pump, such as by using a speed adjusting apparatus.

Additionally, different types of electronic speed controllers may be used to control the pumping system. For instance, an electronic speed controller that is based on a field oriented control (FOC) may be used to control a driving apparatus of the pumping system. In particular, an FOC may be used to as a type of electronic speed controller that measures operating characteristics of a motor, such as torque and magnetic flux of the motor, and uses the characteristics to provide control to the motor. In particular, the use of a field oriented control electronic speed controller may be used to start and stop the driving apparatus. For example, the electronic speed controller may be used to start and stop the driving apparatus quickly, e.g. within a threshold amount of time. The electronic speed controller may be used to start and stop the driving apparatus within 0.01 seconds, 0.02 seconds, 0.03 seconds, 0.04 seconds, 0.05 seconds, 0.06 seconds, 0.07 seconds, 0.08 seconds, 0.09 seconds, 0.1 seconds, 0.15 seconds, 0.2 seconds, 0.25 seconds, 0.3 seconds, 0.35 seconds, 0.4 seconds, 0.45 seconds, 0.5 seconds, 0.55 seconds, 0.6 seconds, 0.65 seconds, 0.7 seconds, 0.75 seconds, 0.8 seconds, 0.85 seconds, 0.9 seconds, 0.95 seconds, 1 seconds, 1.5 seconds, 2 seconds, 2.5 seconds, 3 seconds, 3.5 seconds, 4 seconds, 4.5 seconds, 5 seconds, 6 seconds, 7 seconds, 8 seconds, 9 seconds, 10 seconds, 15 seconds, 20 seconds, 30 seconds, or more than 30 seconds.

Additionally, using the electronic speed controller, a pumping system may have an emergency stop function that allows the pump to be stopped quickly, e.g. within a threshold amount of time. The pumping system may use the electronic speed controller to have an emergency stop function that allows the pump to be stopped within 0.01 seconds, 0.02 seconds, 0.03 seconds, 0.04 seconds, 0.05 seconds, 0.06 seconds, 0.07 seconds, 0.08 seconds, 0.09 seconds, 0.1 seconds, 0.15 seconds, 0.2 seconds, 0.25 seconds, 0.3 seconds, 0.35 seconds, 0.4 seconds, 0.45 seconds, 0.5 seconds, 0.55 seconds, 0.6 seconds, 0.65 seconds, 0.7 seconds, 0.75 seconds, 0.8 seconds, 0.85 seconds, 0.9 seconds, 0.95 seconds, 1 seconds, 1.5 seconds, 2 seconds, 2.5 seconds, 3 seconds, 3.5 seconds, 4 seconds, 4.5 seconds, 5 seconds, 6 seconds, 7 seconds, 8 seconds, 9 seconds, 10 seconds, 15 seconds, 20 seconds, 30 seconds, or more than 30 seconds.

The electronic speed controller may be attached to the driving apparatus. Alternatively, the electronic speed controller may be attached to the pump. In other examples, the electronic speed controller may be separate from the driving apparatus and the pump. For example, when the pumping system is within a UAV, the electronic speed controller may be mounted to the UAV. In particular, the electronic speed controller may be within the UAV. In examples, the electronic speed controller may be attached to the UAV.

In examples, an electronic speed controller may be integrated within a driving apparatus of a pumping system. Accordingly, FIG. 4 illustrates a schematic of a pumping system 400 having a pump 420 and a driving apparatus 410 with an integrated electronic speed controller 405, in accordance with embodiments of the invention. The electronic speed controller may be attached to the driving apparatus. The electronic speed controller may be within the driving apparatus. The electronic speed controller may be within a housing of the driving apparatus. The electronic speed controller may be attached to the exterior of the driving apparatus. The electronic speed controller permanently affixed to the driving apparatus. The electronic speed controller may be detachably affixed to the driving apparatus.

The electronic speed controller may operate with aid of a power source of the electronic speed controller. The power source of the electronic speed controller may or may not be the same as a power source that powers the driving apparatus. The power source of the electronic speed controller may or may not be the same as a power source that powers the one or more propulsion units of the UAV. The power source of the electronic speed controller may or may not be the same as a power source that powers one or more electrical components of the UAV. The power source of the electronic speed controller may be provided within a housing of the driving apparatus. The power source of the electronic speed controller may be provided within a housing of the UAV. The power source of the pumping system may alternatively be provided outside the housing of the UAV.

The use of an integrated electronic speed controller within a driving apparatus may be a benefit when customizing a driving apparatus for use in a pumping system. In particular, integrating the electronic speed controller within a particular driving apparatus may be used to ensure compatibility between the driving apparatus and the electronic speed controller. This internal compatibility may be useful if a first type of the driving apparatus within a pumping system is exchanged for another type of driving apparatus.

Figure 5:
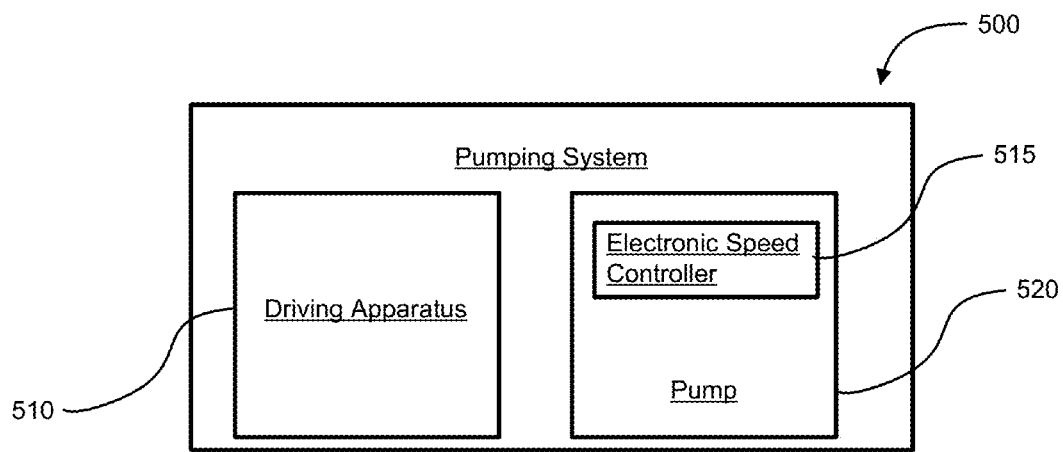
FIG. 5 illustrates a schematic of a pumping system having a driving apparatus and pump with an integrated electronic speed controller, in accordance with embodiments of the invention.

In other examples, an electronic speed controller may be integrated within a pump of a pumping system. Accordingly, FIG. 5 illustrates a schematic of a pumping system 500 having a driving apparatus 510 and a pump 520 with an integrated electronic speed controller 515, in accordance with embodiments of the invention. The electronic speed controller may be attached to the pump. The electronic speed controller may be within the pump. The electronic speed controller may be within a housing of the pump. The electronic speed controller may attached to the exterior of the pump. The electronic speed controller permanently affixed to the pump. The electronic speed controller may be detachably affixed to the pump.

The electronic speed controller may operate with aid of a power source of the electronic speed controller. The power source of the electronic speed controller may or may not be the same as a power source that powers the pump. The power source of the electronic speed controller may or may not be the same as a power source that powers the one or more propulsion units of the UAV. The power source of the electronic speed controller may or may not be the same as a power source that powers one or more electrical components of the UAV. The power source of the electronic speed controller may be provided within a housing of the pump. The power source of the electronic speed controller may be provided within a housing of the UAV. The power source of the pumping system may alternatively be provided outside the housing of the UAV.

The electronic speed controller may control the pump. In particular, the electronic speed controller may control a volume of liquid that is pumped through the pump. For example, when the pump is coupled with a spraying apparatus, the amount of spraying liquid that flows through the pumping system may be precisely controlled using an electronic speed controller. Additionally, the electronic speed controller may control a pressure of liquid that is pumped through the pump. In this way, the flow response within a pump may be easily adjusted using the electronic speed controller and may be adjusted with a fast response time.

Figure 6:
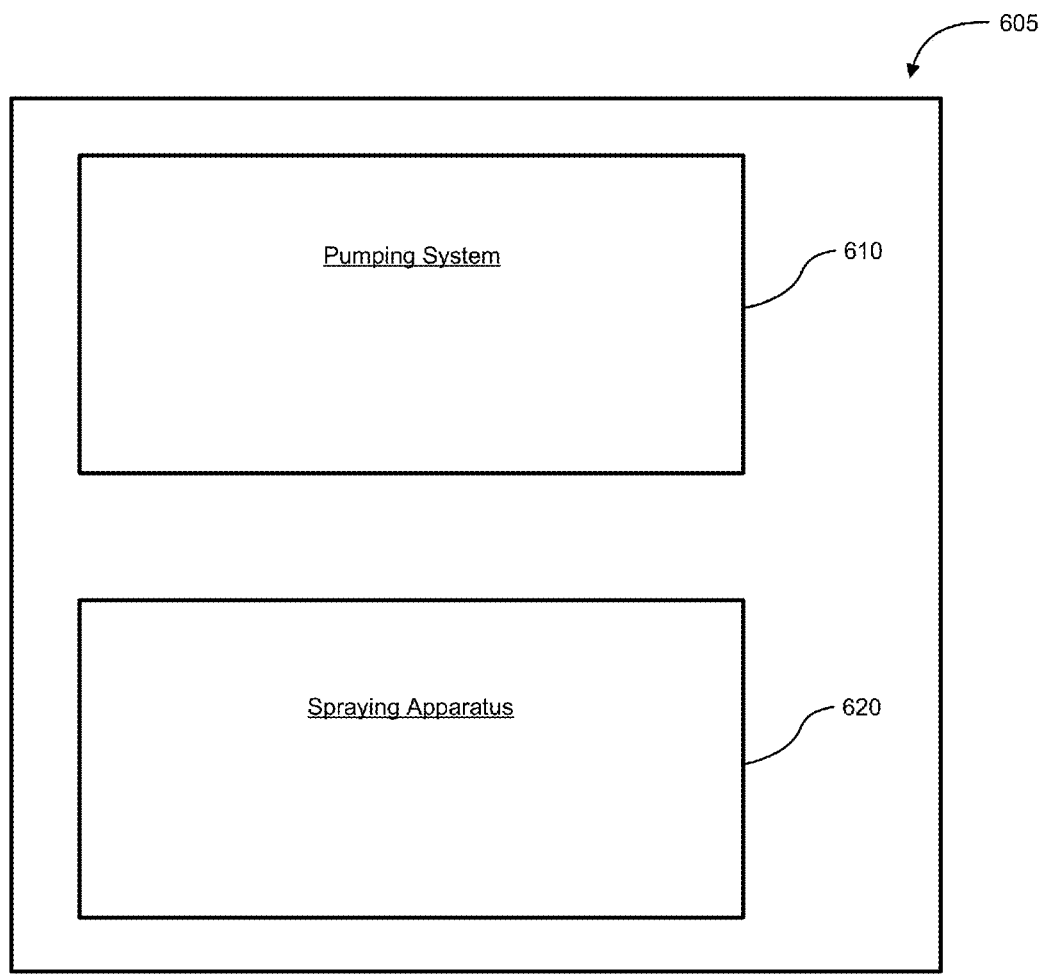
FIG. 6 illustrates a schematic of a pumping system and a spraying apparatus, in accordance with embodiments of the invention.

FIG. 6 illustrates a schematic of a pumping system and a spraying apparatus, in accordance with embodiments of the invention. The pumping system 610 may be operatively connected to spraying apparatus 620. In particular, the pumping system may be physically coupled to the spraying apparatus. The spraying apparatus may be used for spraying pesticides or fertilizer. Pumping systems that are used with spraying apparatus may be used by individuals spraying pesticides or fertilizer in a field. In particular, the pumping system may be coupled with the spraying apparatus within a holder which may then be carried by a farmer who is tending to his field. A holder may comprise a portable or hand-held apparatus that is adapted to hold a spraying apparatus. For example, the holder may be a bag, a backpack, or another form of carrying device or vehicle. In examples, the driving apparatus and pump may be exposed to an external environment. Alternatively, pumping systems that are coupled with spraying apparatus may be used in an agricultural unmanned aerial vehicle (UAV) for pumping out pesticides or fertilizer from the spraying apparatus.

In examples, a pump of the pumping system may be communicatively coupled to the spraying apparatus. Additionally, the pumping system and the spraying apparatus may form a single unit. By forming the pumping system and the spraying apparatus as a single unit, the single unit may form a compact, mobile unit that may be carried by individuals. Alternatively, the single unit may be carried in an UAV, such as the UAV as provided in FIG. 1. In additional examples, the pumping system and the spraying apparatus may be combined within a holder 605. A holder may comprise a portable or hand-held apparatus that is adapted to hold a spraying apparatus. For example, the holder may be a bag, a backpack, or another form of carrying device or vehicle. In examples, the driving apparatus and pump may be exposed to an external environment.

The spraying apparatus may include one or more outlets, and an assembly for controlling flow of fluid from the fluid reservoir to the one or more outlets. The one or more outlets may be nozzles. In examples, a pump of the pumping system may transmit fluid from a fluid reservoir to the spraying apparatus where the fluid may be sprayed from the nozzles of the spraying apparatus. The fluid may include a liquid or a gaseous fluid. In some embodiments, the fluid may include particles therein. For instance, the gaseous fluid may include powder or other particles that may be with the gaseous fluid. Any description herein of fluid handled by the pumping system may also apply to any particulates, powders, or other solid substances that may be handled by the pumping system. The spraying apparatus may also be used to spray fertilizer, seeds, or powders. In examples, the spraying apparatus may be a pesticide spraying apparatus.

Figure 7:
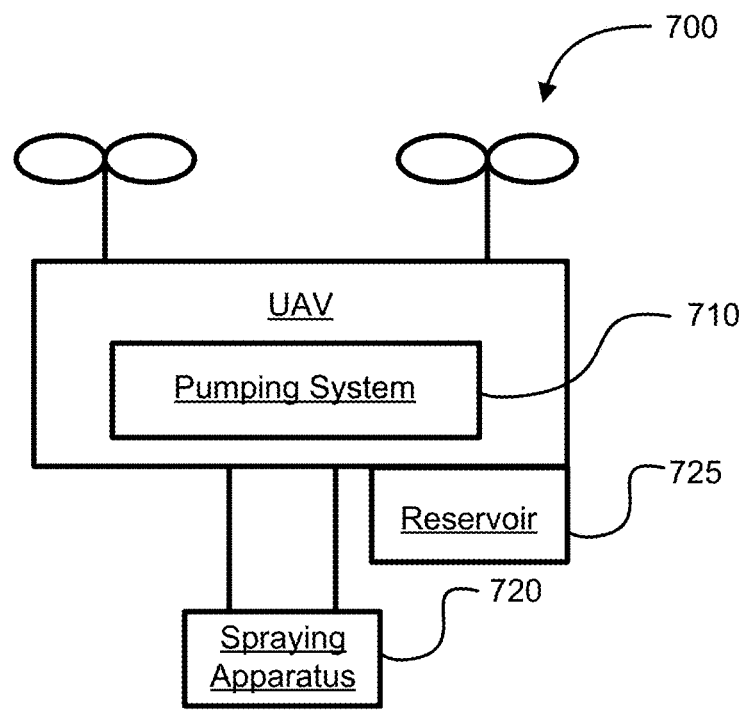
FIG. 7 illustrates a schematic of a UAV having a pumping system and a spraying apparatus, in accordance with embodiments of the invention.

In some examples, a pumping system may be operatively coupled to a spraying apparatus in a UAV. This is illustrated in FIG. 7, which provides a schematic of a UAV 700 having a pumping system 710 and a spraying apparatus 720, in accordance with embodiments of the invention. Additionally, the pumping system may be operatively coupled to a fluid reservoir. FIG. 7 illustrates a fluid reservoir 725 that is a payload of the UAV. A fluid reservoir may be attached externally to the UAV. The use of spraying apparatus within agricultural UAVs allows for spraying operations to be controlled by a ground remote controller or a global positioning service (GPS) signal. Further, the downward airflow generated by the rotors of a UAV may facilitate a penetrating of the sprayed substance to the desired target. As such, by using a UAV, to distribute sprayed substances, the spraying effect of the substances may be improved. Since the UAVs can be operated over a long distance, and since an operator may not be exposed to the pesticide, safety in using a spraying apparatus that utilizes UAV 700 may be improved.

The spraying apparatus may operate while the UAV is in flight. Operation of the spraying apparatus may include delivery of fluid from a fluid reservoir to one or more outlets of the spraying apparatus. In examples, the pumping system may deliver fluid from the fluid reservoir to the spraying apparatus. The fluid may be sprayed from the one or more outlets of the spraying apparatus. Thus, fluid may be sprayed from the UAV while the UAV is in flight. The spraying apparatus may operate while the UAV is landed. The spraying apparatus may optionally be prevented from operating while the UAV is landed. The spraying apparatus may be able to operate only while the UAV is in flight. The spraying apparatus may automatically start operating while the UAV is in flight.

The spraying apparatus may automatically start operating when the UAV reaches a predetermined altitude. The spraying apparatus may start operating, or modify operation of, the spraying apparatus based on sensed characteristics of a surrounding environment. In particular, the spraying apparatus may spray material based on feedback received from one or more sensor, or based on measured energy/power output. Additionally, the spraying apparatus may spray materials based on the identification of a particular target. In particular, a UAV may have target identifying capabilities that may be used to identify a target, which in turn may cause the spraying apparatus to expel materials. A target may be identified using visual detection, GPS sensors, or other ways of determining location. Alternatively, the spraying apparatus may operate in response to a user command to operate. The user command to operate may be delivered with aid of a remote terminal. In examples, a user command may include instructions to turn on the spraying apparatus, turn off the spraying apparatus, control the volume of liquid that passes through a spraying apparatus, or control a direction of fluid that passes through a spraying apparatus.

Additionally, the operation of the spraying apparatus may be affected by the operation of the UAV. In particular, the spraying apparatus may alter its output of spraying material based on the operation of the UAV. As the UAV accelerates, the spraying apparatus may increase the amount of spraying materials that are output. As the UAV decelerates, the spraying apparatus may decrease the amount of spraying materials that are output. In other examples, when a UAV travels at a speed above a certain threshold, the spraying apparatus may increase the amount of spraying materials that are output. When the UAV travels at a speed below a certain threshold, the spraying apparatus may decrease the amount of spraying materials that are output. Additionally, the spraying apparatus may have a plurality of fluid outlets. Based on the speed, acceleration, deceleration, or other factors, the spraying apparatus may utilize a greater number of fluid outlets or a lesser number of fluid outlets of the plurality of outlets. For example, if the UAV is accelerating, the spraying apparatus may increase the number of fluid outlets that the spraying apparatus is using. If the UAV is decelerating, the spraying apparatus may decrease the number of fluid outlets that the spraying apparatus is using. Additionally, the spraying system may alter its output of spraying material based on the height of the UAV. As the UAV gains altitude, the spraying system may increase the amount of spraying materials that are output. As the UAV loses altitude, the spraying system may decrease the amount of spraying materials that are output. Additionally, the spraying system may have a plurality of fluid outlets. Based on the altitude of the UAV, the spraying system may utilize a greater number of fluid outlets or a lesser number of fluid outlets of the plurality of outlets. For example, if the UAV is gaining altitude, the spraying system may increase the number of fluid outlets that the spraying system is using. If the UAV is losing altitude, the spraying system may decrease the number of fluid outlets that the spraying system is using.

In addition to including the pumping system and the spraying apparatus, the UAV may include one or more electronic components such as a flight control module, a GPS unit, and a wireless communication module. Additionally, the UAV may comprise a payload. The payload may include multiple parts. For example, the payload may include a fluid reservoir and/or an imaging device. The payload may be carried beneath a central body of the UAV. The payload may also be movable with respect to the central body of the UAV. Additionally, the payload may weigh at least 10 kg. In some embodiments, the payload can be a material reservoir. The payload may be the pumping system and/or the spraying apparatus. In some instances, multiple payloads and/or types of payloads may be provided. For example, an agricultural product distribution system and a camera may be provided as payloads of a UAV.

Figure 8:
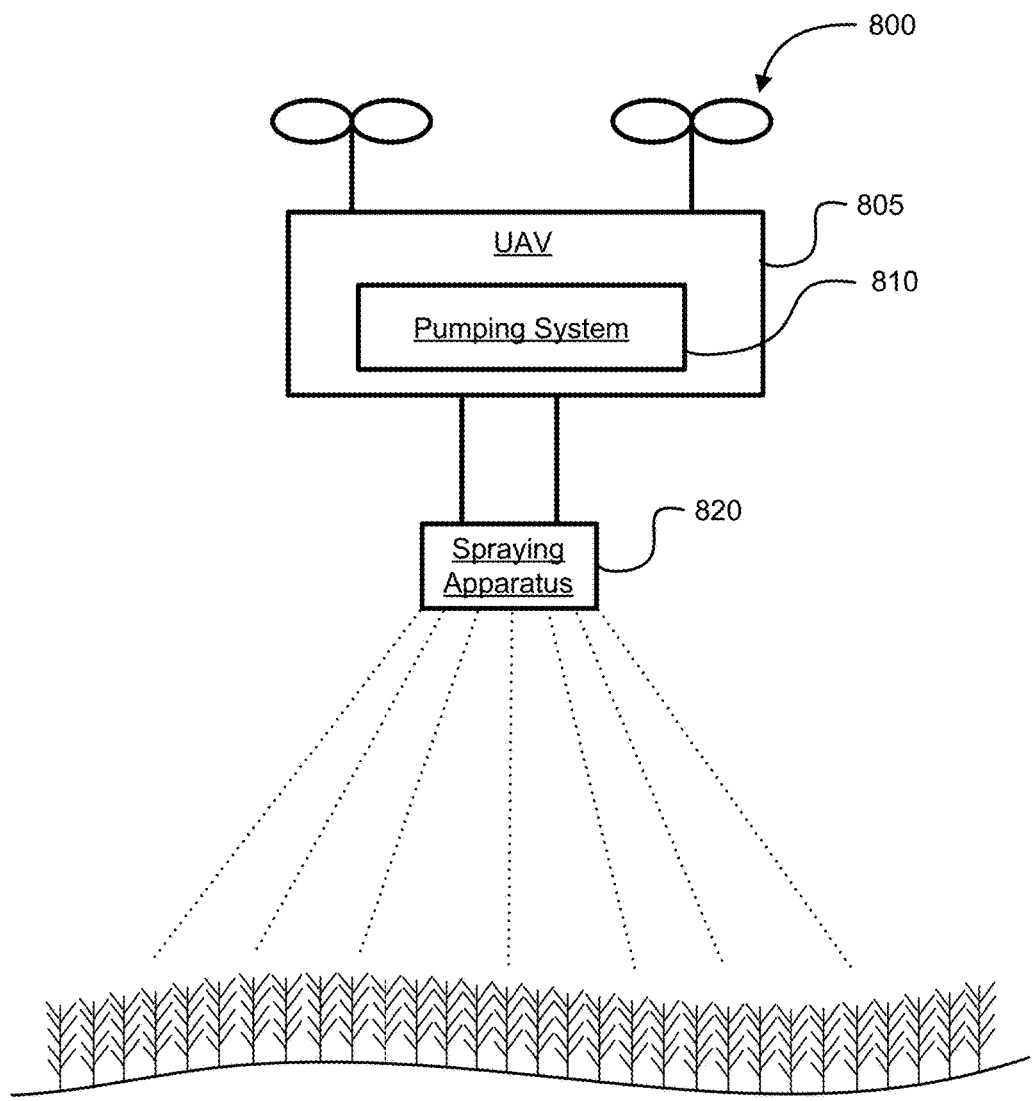
FIG. 8 illustrates a UAV with a spraying apparatus spraying a field, in accordance with embodiments of the invention.

As discussed above, spraying apparatus that utilize efficient pumps as discussed herein may be carried on agricultural UAVs to spray materials on to crops. Accordingly, FIG. 8 illustrates a UAV with a spraying apparatus spraying a field, in accordance with embodiments of the invention. FIG. 8 comprises a UAV 800 having a pumping system 810 and a spraying apparatus 820, in accordance with embodiments of the invention. The pumping system and the spraying apparatus may be within a housing 805 of the UAV. Alternatively, the pumping system may be within housing of the UAV and the spraying apparatus may be mounted to the UAV as a payload. Additionally, the operation of the spraying apparatus may be affected by the operation of the UAV. In particular, the spraying apparatus may alter its output of spraying material based on the operation of the UAV. As the UAV accelerates, the spraying apparatus may increase the amount of spraying materials that are output. As the UAV decelerates, the spraying apparatus may decrease the amount of spraying materials that are output. Additionally, the spraying apparatus may vary the amount of spraying material that is dispersed based on the location of the UAV. In particular, the spraying apparatus may vary the amount of spraying material that is dispersed based on the geographic location of the UAV as determined by a global positioning system (GPS). As such, the spraying apparatus may initiate the spraying of material from the fluid reservoir when the UAV is in an area that is designated as being within a pre-determined zone, and the spraying apparatus may cease the spraying of the material from the fluid reservoir when the spraying apparatus has left the pre-determined zone. Geographic boundaries may be defined by the use of GPS, by the use of relational calculations of the UAV and a last-recognized geographic location, and by the detection of geofences.

Additionally, information that is gathered from an image capture device that is connected to the UAV may affect the operation of the spraying system. In particular, the spraying system may alter its output of spraying material based on the image data that is received by the UAV. When the UAV is spraying densely spaced agricultural crops, such as cornfields, the UAV may increase the amount of spraying material that is output. When the UAV is spraying sparsely spaced agricultural crops, such as orchards, the UAV may decrease the amount of spraying material that is output. The identification of densely spaced agricultural crops and/or sparsely spaced agricultural crops may be made by the controller based on information that is received from the image capture device. In other examples, the image capture device may gather data that is used by the controller to identify urban areas. The identification of urban areas by the controller may be used to provide the UAV with instructions to cease its output of spraying materials. Alternatively, the image capture device may gather data that is used by the controller to identify non-crop structures, such as farmhouses, barns, or roads, that are within the same geographic area as crops. Based on this data, the controller may alter the direction of sprayed materials so as to avoid non-crop structures.

The UAV is able to spray the field with a spraying fluid. The amount of fluid that is sprayed across the field may vary based on the dispersion rate of the liquid, the speed that the UAV is flying, weather factors, and the characteristics of the liquid itself. In examples, the spraying apparatus may be used to spray non-liquid materials, such as seeds and powders. Additionally, the composition of the spraying material that is output from the spraying apparatus may vary based on factors such as weather, speed, and other conditions. For example, if the UAV determines that it is raining, the UAV may alter the composition of the spraying material to be more viscous so as to make the spraying material less easy to dilute in the precipitation.

When an efficient pumping system that has a pump and a brushless motor is used, the pumping system that is used to transmit liquid from the fluid reservoir to liquid outlets of the spraying apparatus may be significantly lighter than when a pumping system having a brush motor is used. This, in turn, may result in greater fuel efficiency when using an aerial mobile vehicle such as a UAV. As such, when lighter pumping systems are used, the UAV may be able to have a longer cruise duration than when heavier pumping systems are used.

Figure 9:
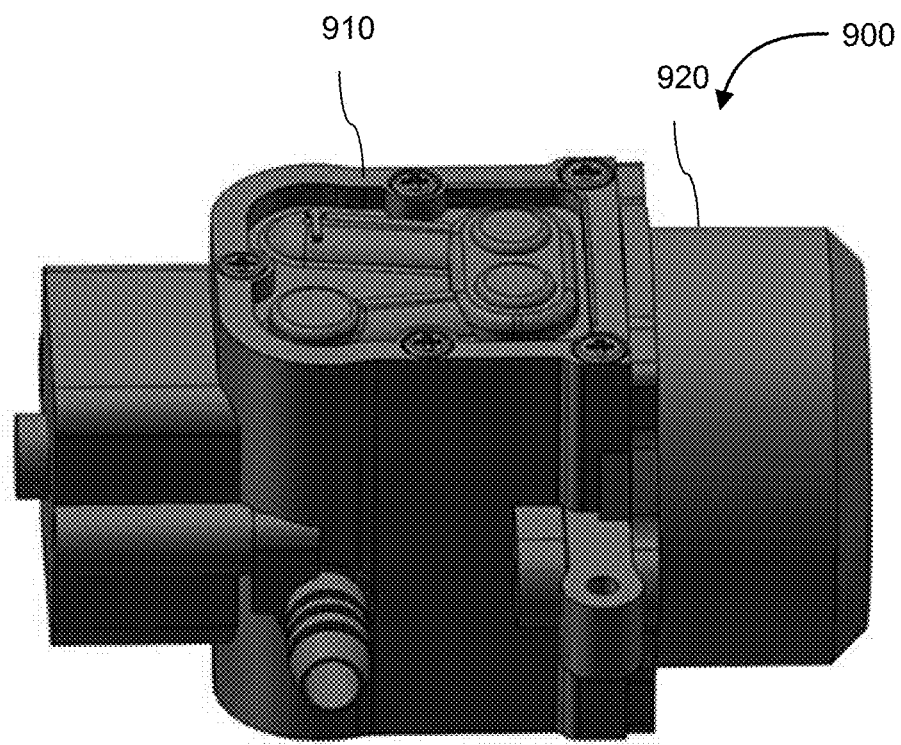
FIG. 9 illustrates a perspective view of a pumping system, in accordance with embodiments of the invention.

FIG. 9 illustrates a perspective view of a pumping system, in accordance with embodiments of the invention. In particular, FIG. 9 includes a combined pump 910 and driving apparatus 920. Pump 910 is an external view of a diaphragm pump and driving apparatus 920 is an external view of a motor cap. As seen in FIG. 9, pumping system 900 is a single unit. As such, pumping system 900 may be portable, such as by an individual working in fields or by an aerial vehicle such as a UAV. Additionally, by providing an integrated design, pumping system 900 may be integrated so as to be waterproof and/or dustproof.

Figure 10:
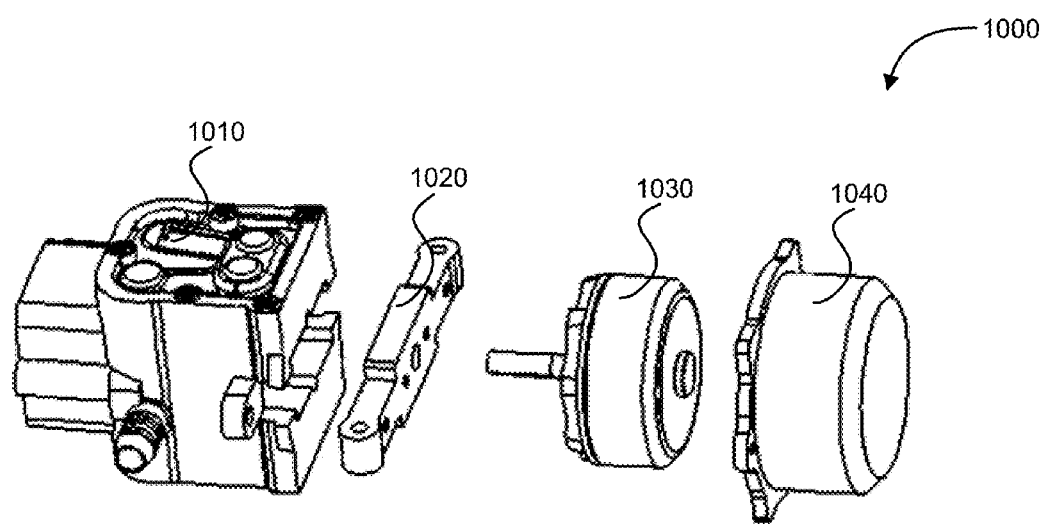
FIG. 10 illustrates an exploded view of a pumping system, in accordance with embodiments of the invention.

FIG. 10 illustrates an exploded view of a pumping system, in accordance with embodiments of the invention. In particular, pumping system 1000 provides a diaphragm pump head 1010, a motor mount 1020, a brushless motor 1030, and a motor end cap 1040. As described above, a pump such as diaphragm pump 1010 may be physically coupled with a driving apparatus such as brushless motor 1030. FIG. 10 provides an illustration of this physical coupling as brushless motor 1030 is physically coupled to diaphragm pump head 1010 via motor mount 1020. In this way, rotational energy that is generated at brushless motor 1030 is provided directly to diaphragm pump head 1010. Further, FIG. 10 provides a motor end cap 1040 to cover and protect brushless motor 1030.

Figure 11:
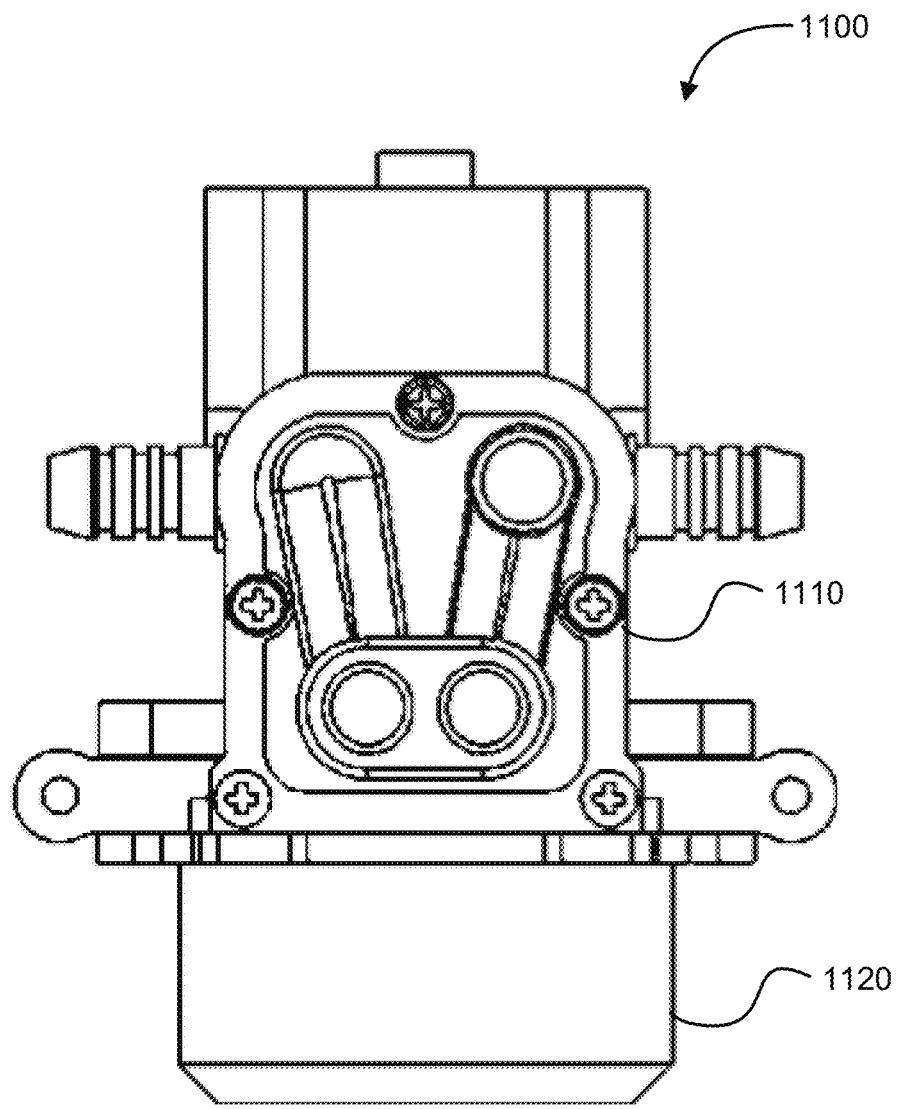
FIG. 11 illustrates a front view of a combined pump and driving apparatus, in accordance with embodiments of the invention.
Figure 12:
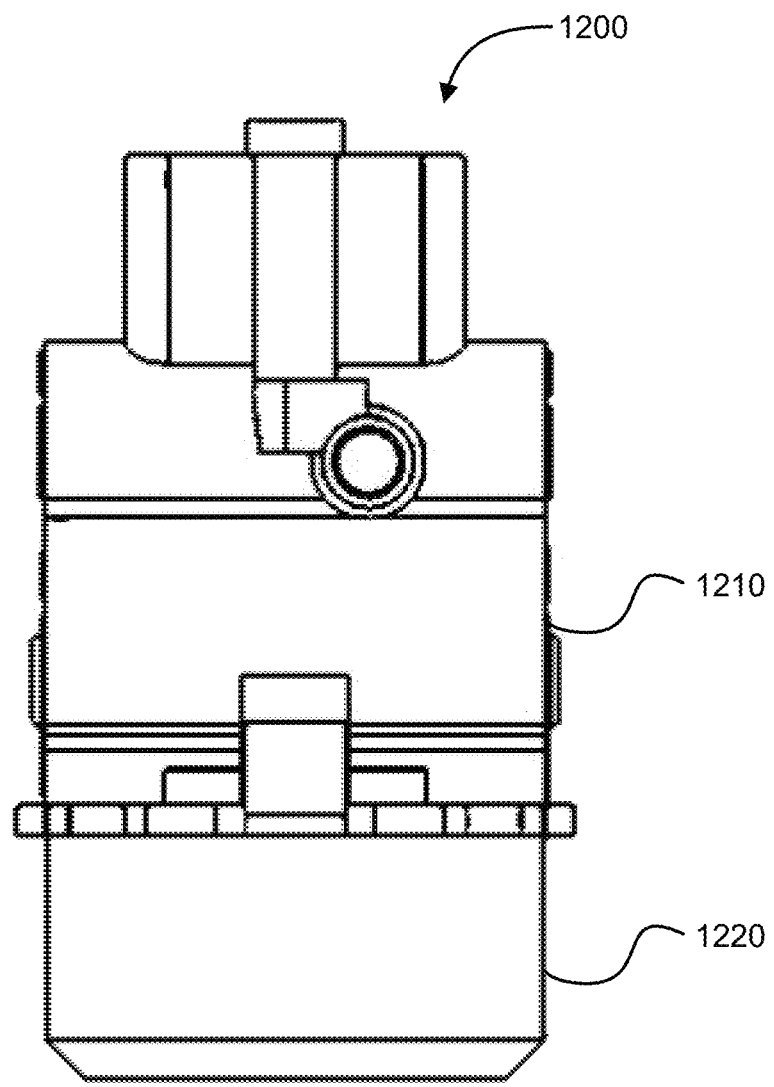
FIG. 12 illustrates a left view of a combined pump and driving apparatus, in accordance with embodiments of the invention.
Figure 13:
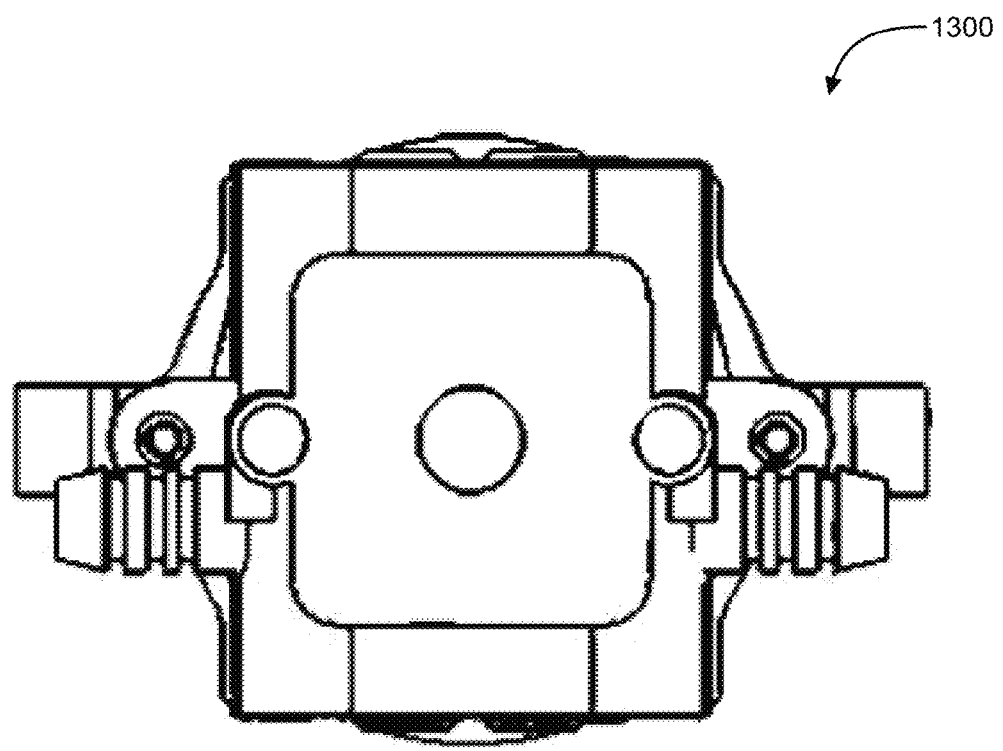
FIG. 13 illustrates a top view of a combined pump and driving apparatus, in accordance with embodiments of the invention.
Figure 14:
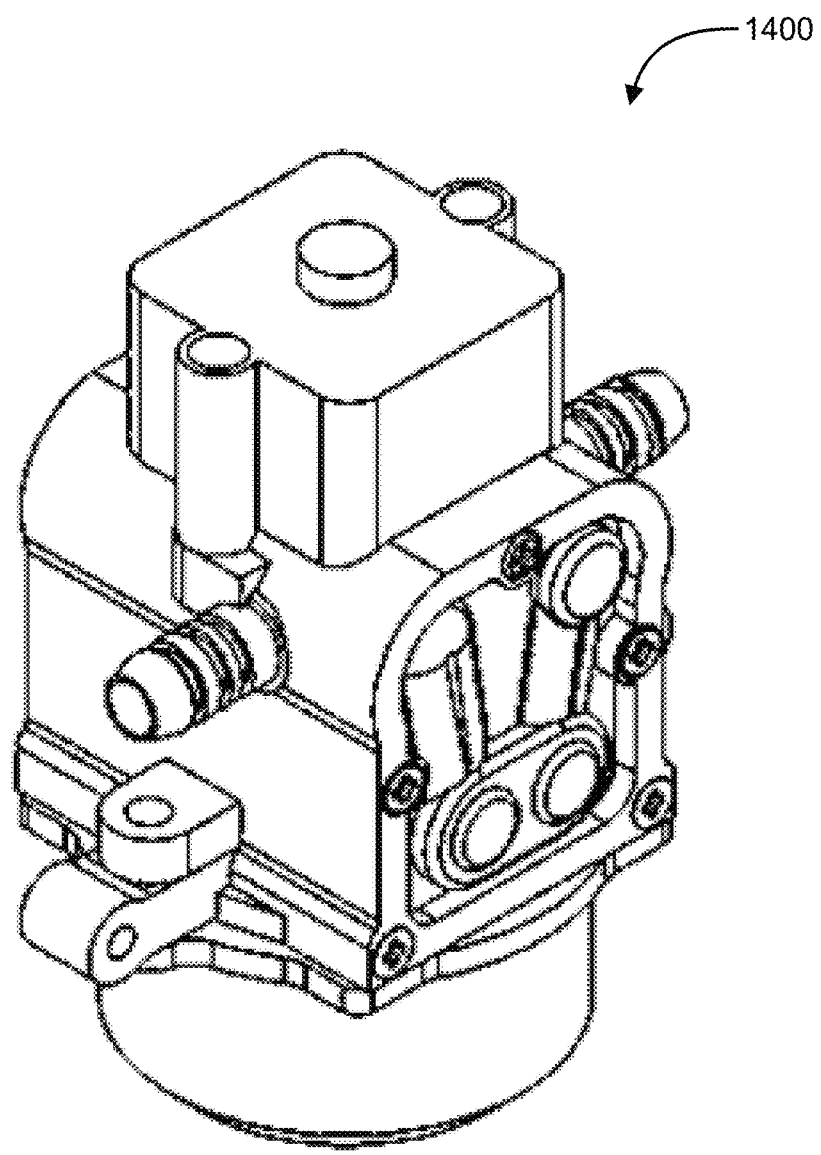
FIG. 14 illustrates another perspective view of a combined pump and driving apparatus, in accordance with embodiments of the invention.

FIG. 11 illustrates a front view of a pumping system, in accordance with embodiments of the invention. In particular, FIG. 11 provides a view of pump component 1110 and driving apparatus 1120. Additionally, FIG. 12 illustrates a left view of a pumping system 1200, in accordance with embodiments of the invention. In particular, FIG. 12 provides a view of a pump component 1210 and a driving apparatus 1220. Seen from another perspective, FIG. 13 illustrates a top view of a pumping system 1300, in accordance with embodiments of the invention. Further, FIG. 14 illustrates another perspective view of a pumping system 1400, in accordance with embodiments of the invention.

Figure 15:
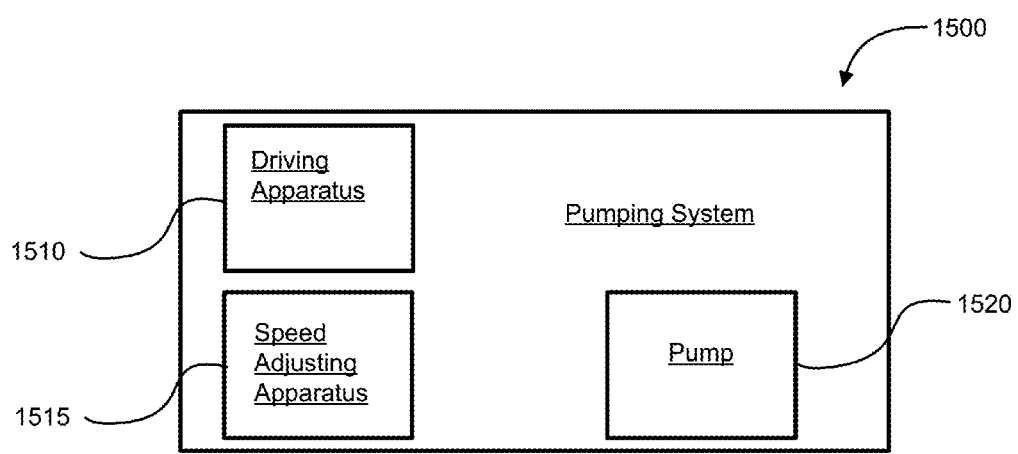
FIG. 15 illustrates a schematic of a pumping system having a driving apparatus, a speed adjusting apparatus, and a pump, in accordance with embodiments of the invention.

As discussed above, the driving apparatus of a pumping system may produce a first rotational energy having a speed component and a torque component. However, the rotational energy that is produced by the driving apparatus may not be adapted to a pump in the pumping system. In order to integrate a driving apparatus with a pump in a pumping system, a speed adjusting apparatus may be used. As such, FIG. 15 illustrates a schematic of a pumping system 1500 having a driving apparatus 1510, a speed adjusting apparatus 1515, and a pump 1520, in accordance with embodiments of the invention. By utilizing a speed adjusting apparatus 1515, the rotational energy produced by a driving apparatus 1510 may be adapted to meet the input requirements of a pump. In particular, when using a speed adjusting apparatus, the speed component of rotational energy that is produced by the driving apparatus may be increased or decreased. In this way, the speed adjusting apparatus may be used to adjust the torque and rotating speed of a first rotational energy that is produced by the driving apparatus to a torque and rotating speed of a second rotational energy. Additionally, the torque and rotating speed of the second rotational energy may satisfy the requirements of the pump.

In examples, the speed adjusting apparatus may use a gear mechanism to reduce the speed component of rotational energy that is produced by the driving apparatus. In particular, the speed adjusting apparatus may reduce a speed component by using the gear mechanism to translate a high speed component into a lower speed component. In examples, the speed adjusting apparatus may reduce a speed component of a received rotational energy by 1%, 2%, 3%, 4%, 5%, 6%, 7%, 8%, 9%, or 10%, 12%, 15%, 20%, 25%, 30%, 35%, 40%, 45%, 50%, 55%, 60%, 65%, 70%, 75%, 80%, 90%, 92%, 94%, 96%, 97%, 98%, or greater than 98%. Alternatively, the speed adjusting apparatus may increase a speed component by using the gear mechanism to translate a low speed component into a high speed component. In examples, the speed adjusting apparatus may increase a speed component of a received rotational energy by 1%, 2%, 3%, 4%, 5%, 6%, 7%, 8%, 9%, or 10%, 12%, 15%, 20%, 25%, 30%, 35%, 40%, 45%, 50%, 55%, 60%, 65%, 70%, 75%, 80%, 90%, 100%, 200%, 500%, or greater than 500%.

In further examples, the speed adjusting apparatus may use a belt mechanism to reduce the speed component of rotational energy that is produced by the driving apparatus. In particular, the speed adjusting apparatus may reduce a speed component by using the belt mechanism to translate a high speed component into a lower speed component. In examples, the speed adjusting apparatus may reduce a speed component of a received rotational energy by 1%, 2%, 3%, 4%, 5%, 6%, 7%, 8%, 9%, or 10%, 12%, 15%, 20%, 25%, 30%, 35%, 40%, 45%, 50%, 55%, 60%, 65%, 70%, 75%, 80%, 90%, 92%, 94%, 96%, 97%, 98%, or greater than 98%. Alternatively, the speed adjusting apparatus may increase a speed component by using the belt mechanism to translate a low speed component into a high speed component. In examples, the speed adjusting apparatus may increase a speed component of a received rotational energy by 1%, 2%, 3%, 4%, 5%, 6%, 7%, 8%, 9%, or 10%, 12%, 15%, 20%, 25%, 30%, 35%, 40%, 45%, 50%, 55%, 60%, 65%, 70%, 75%, 80%, 90%, 100%, 200%, 500%, or greater than 500%.

Additionally or alternatively, the speed adjusting apparatus may use a friction mechanism, such as a friction wheel, to reduce the speed component of rotational energy that is produced by the driving apparatus. In particular, the speed adjusting apparatus may reduce a speed component by using the friction mechanism to translate a high speed component into a lower speed component. In examples, the speed adjusting apparatus may reduce a speed component of a received rotational energy by 1%, 2%, 3%, 4%, 5%, 6%, 7%, 8%, 9%, or 10%, 12%, 15%, 20%, 25%, 30%, 35%, 40%, 45%, 50%, 55%, 60%, 65%, 70%, 75%, 80%, 90%, 92%, 94%, 96%, 97%, 98%, or greater than 98%. Alternatively, the speed adjusting apparatus may increase a speed component by using the friction mechanism to translate a low speed component into a high speed component. In examples, the speed adjusting apparatus may increase a speed component of a received rotational energy by 1%, 2%, 3%, 4%, 5%, 6%, 7%, 8%, 9%, or 10%, 12%, 15%, 20%, 25%, 30%, 35%, 40%, 45%, 50%, 55%, 60%, 65%, 70%, 75%, 80%, 90%, 100%, 200%, 500%, or greater than 500%.

In an example, a driving apparatus 1510, such as a motor, of a pumping system 1500 may generate a first rotational energy by operating the motor. The first rotational energy may have a first torque component and a first speed component. After the first rotational energy is produced, and prior to the rotational energy being passed to pump 1520 of the pumping system 1500, a speed adjusting apparatus 1515 may convert the first rotational energy to a second rotational energy having a second torque component and a second speed component. In particular, the second torque component may differ from the first torque component. Additionally or alternatively, the second speed component may differ from the first speed component. Further, the speed adjusting apparatus 1515 may convert the first rotational energy to a second rotational energy that is adapted to pump 1520. Once the second rotational energy is generated, the second rotational energy may be provided to pump 1520.

In examples, the first rotational energy that is produced by operating the motor may be controlled by a motor speed controller. Additionally, the motor that is used as a driving apparatus 1510 may be a brush direct current motor, a brushless direct current motor, an alternating current induction motor, a permanent magnet synchronous motor, or another type of motor. In examples, the driving apparatus 1510 may be physically coupled to the speed adjusting apparatus 1515. In further examples, the pump 1520 may be physically coupled to the speed adjusting apparatus 1520. Additionally, the driving apparatus 1510, speed adjusting apparatus 1515, and pump 1520 may form a single unit.

Additionally, the pump that is used as pump 1520 may be a pressure-based pump, a hydraulic pump, a diaphragm pump, an electric mini-diaphragm pump, or another type of pump. Pump 1520 may also be operably couple to a spraying apparatus. In particular, pump 1520 may be physically coupled to a spraying apparatus that may include a fluid reservoir. Pump 1520 may draw spraying liquid from the fluid reservoir of the spraying apparatus and may transmit the liquid from the fluid reservoir to nozzles of the spraying apparatus.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 16:
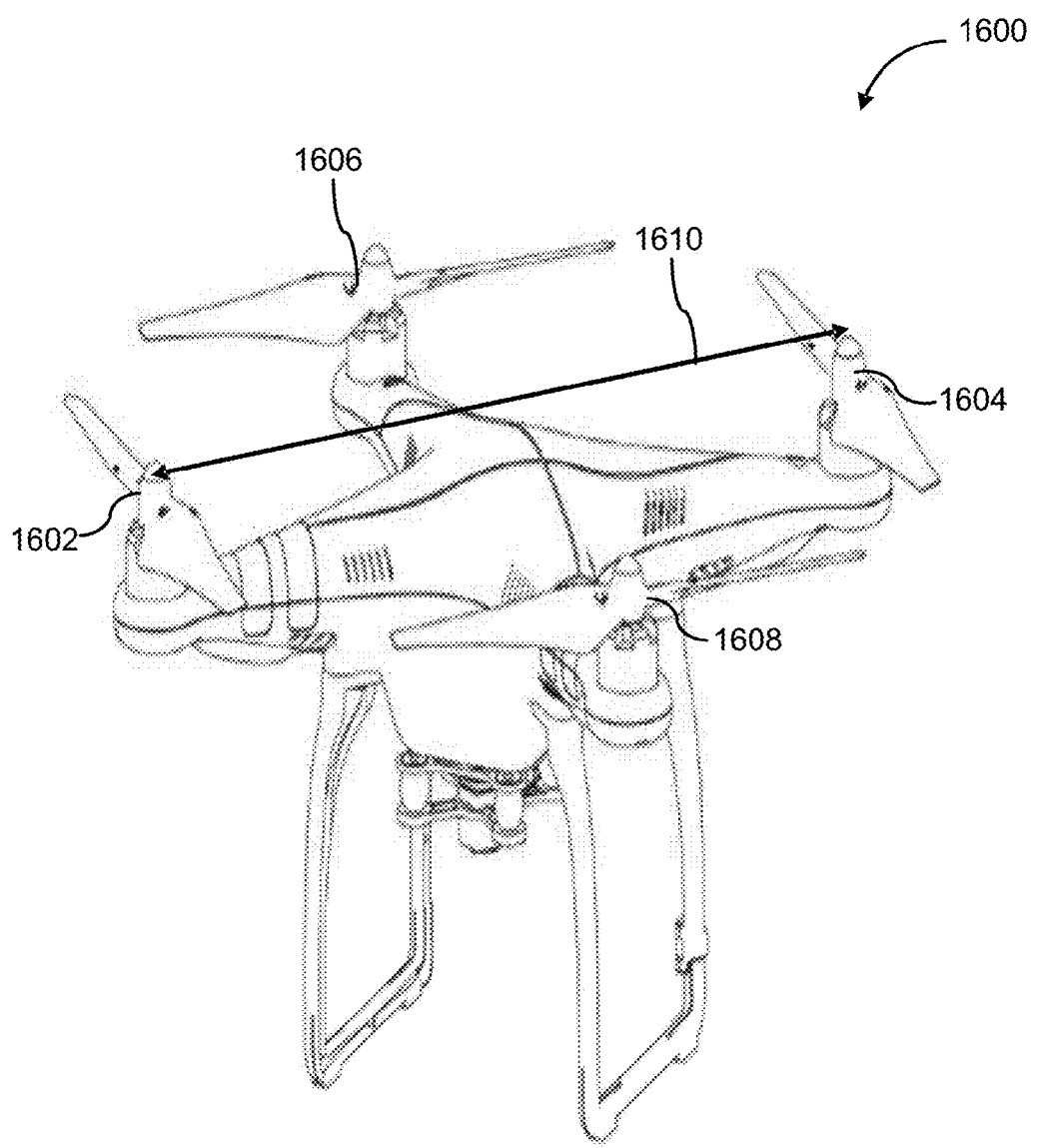
FIG. 16 illustrates an unmanned aerial vehicle, in accordance with an embodiment of the invention.

FIG. 16 illustrates an unmanned aerial vehicle (UAV) 1600, in accordance with embodiments of the present invention. The UAV may be an example of a movable object as described herein. The UAV 1600 can include a propulsion system having four rotors 1602, 1604, 1606, and 1608. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 410. For example, the length 1610 can be less than or equal to 2 m, or less than equal to 5 m. In some embodiments, the length 1610 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 17:
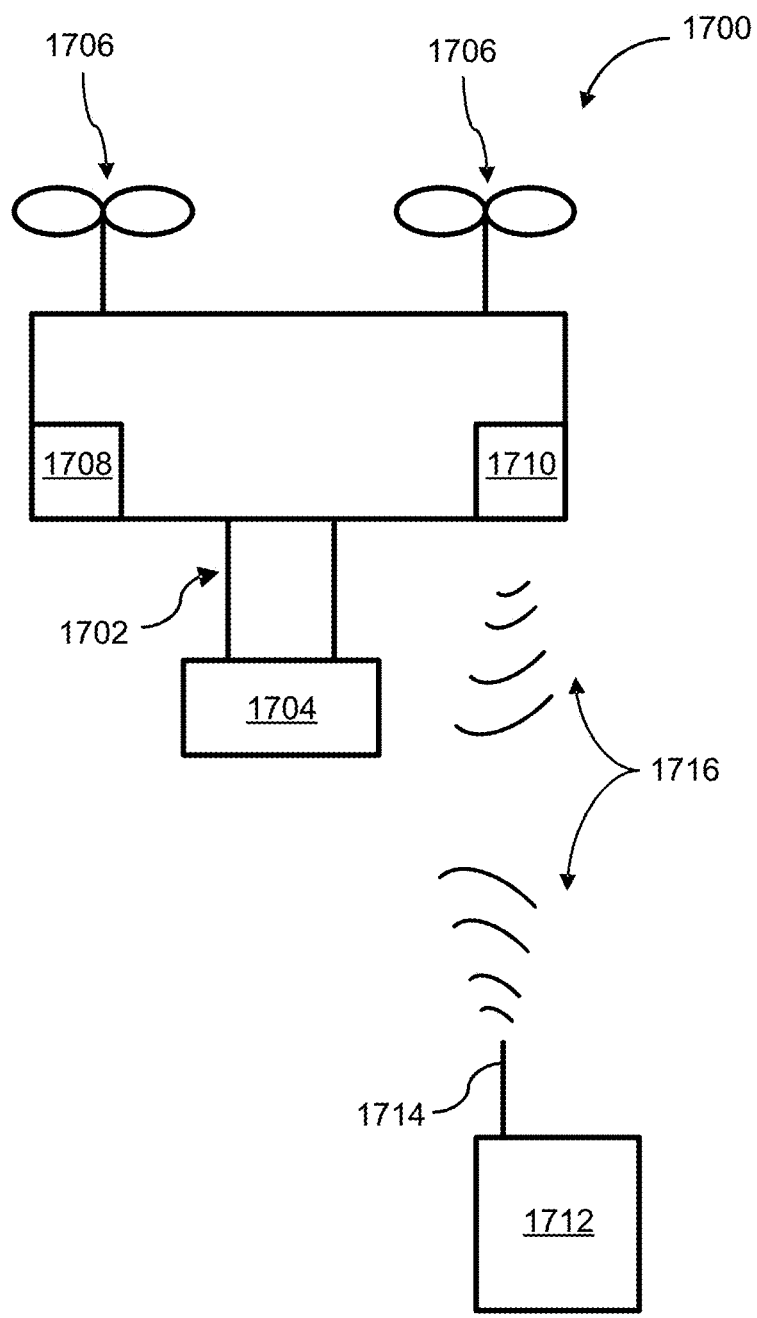
FIG. 17 illustrates a movable object including a carrier and a payload, in accordance with an embodiment of the invention.

FIG. 17 illustrates a movable object 1700 including a carrier 1702 and a payload 1704, in accordance with embodiments. Although the movable object 1700 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1704 may be provided on the movable object 1700 without requiring the carrier 1702. The movable object 1700 may include propulsion mechanisms 1706, a sensing system 1708, and a communication system 1710.

The propulsion mechanisms 1706 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1706 can be mounted on the movable object 1700 using any suitable means, such as a support element (e.g., a drive shaft) as described elsewhere herein. The propulsion mechanisms 1706 can be mounted on any suitable portion of the movable object 1700, such on the top, bottom, front, back, sides, or suitable combinations thereof.

In some embodiments, the propulsion mechanisms 1706 can enable the movable object 1700 to take off vertically from a surface or land vertically on a surface without requiring any horizontal movement of the movable object 1700 (e.g., without traveling down a runway). Optionally, the propulsion mechanisms 1706 can be operable to permit the movable object 1700 to hover in the air at a specified position and/or orientation. One or more of the propulsion mechanisms 1700 may be controlled independently of the other propulsion mechanisms. Alternatively, the propulsion mechanisms 1700 can be configured to be controlled simultaneously. For example, the movable object 1700 can have multiple horizontally oriented rotors that can provide lift and/or thrust to the movable object. The multiple horizontally oriented rotors can be actuated to provide vertical takeoff, vertical landing, and hovering capabilities to the movable object 1700. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1700 (e.g., with respect to up to three degrees of translation and up to three degrees of rotation).

The sensing system 1708 can include one or more sensors that may sense the spatial disposition, velocity, and/or acceleration of the movable object 1700 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1708 can be used to control the spatial disposition, velocity, and/or orientation of the movable object 1700 (e.g., using a suitable processing unit and/or control module, as described below). Alternatively, the sensing system 1708 can be used to provide data regarding the environment surrounding the movable object, such as weather conditions, proximity to potential obstacles, location of geographical features, location of manmade structures, and the like.

The communication system 1710 enables communication with terminal 1712 having a communication system 1714 via wireless signals 1716. The communication systems 1710, 1714 may include any number of transmitters, receivers, and/or transceivers suitable for wireless communication. The communication may be one-way communication, such that data can be transmitted in only one direction. For example, one-way communication may involve only the movable object 1700 transmitting data to the terminal 1712, or vice-versa. The data may be transmitted from one or more transmitters of the communication system 1710 to one or more receivers of the communication system 1712, or vice-versa. Alternatively, the communication may be two-way communication, such that data can be transmitted in both directions between the movable object 1700 and the terminal 1712. The two-way communication can involve transmitting data from one or more transmitters of the communication system 1710 to one or more receivers of the communication system 1714, and vice-versa.

In some embodiments, the terminal 1712 can provide control data to one or more of the movable object 1700, carrier 1702, and payload 1704 and receive information from one or more of the movable object 1700, carrier 1702, and payload 1704 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1706), or a movement of the payload with respect to the movable object (e.g., via control of the carrier 1702). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1708 or of the payload 1704). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1712 can be configured to control a state of one or more of the movable object 1700, carrier 1702, or payload 1704. Alternatively or in combination, the carrier 1702 and payload 1704 can also each include a communication module configured to communicate with terminal 1712, such that the terminal can communicate with and control each of the movable object 1700, carrier 1702, and payload 1704 independently.

In some embodiments, the movable object 1700 can be configured to communicate with another remote device in addition to the terminal 1712, or instead of the terminal 1712. The terminal 1712 may also be configured to communicate with another remote device as well as the movable object 1700. For example, the movable object 1700 and/or terminal 1712 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1700, receive data from the movable object 1700, transmit data to the terminal 1712, and/or receive data from the terminal 1712. Optionally, the remote device can be connected to the Internet or other telecommunications network, such that data received from the movable object 1700 and/or terminal 1712 can be uploaded to a website or server.

Figure 18:
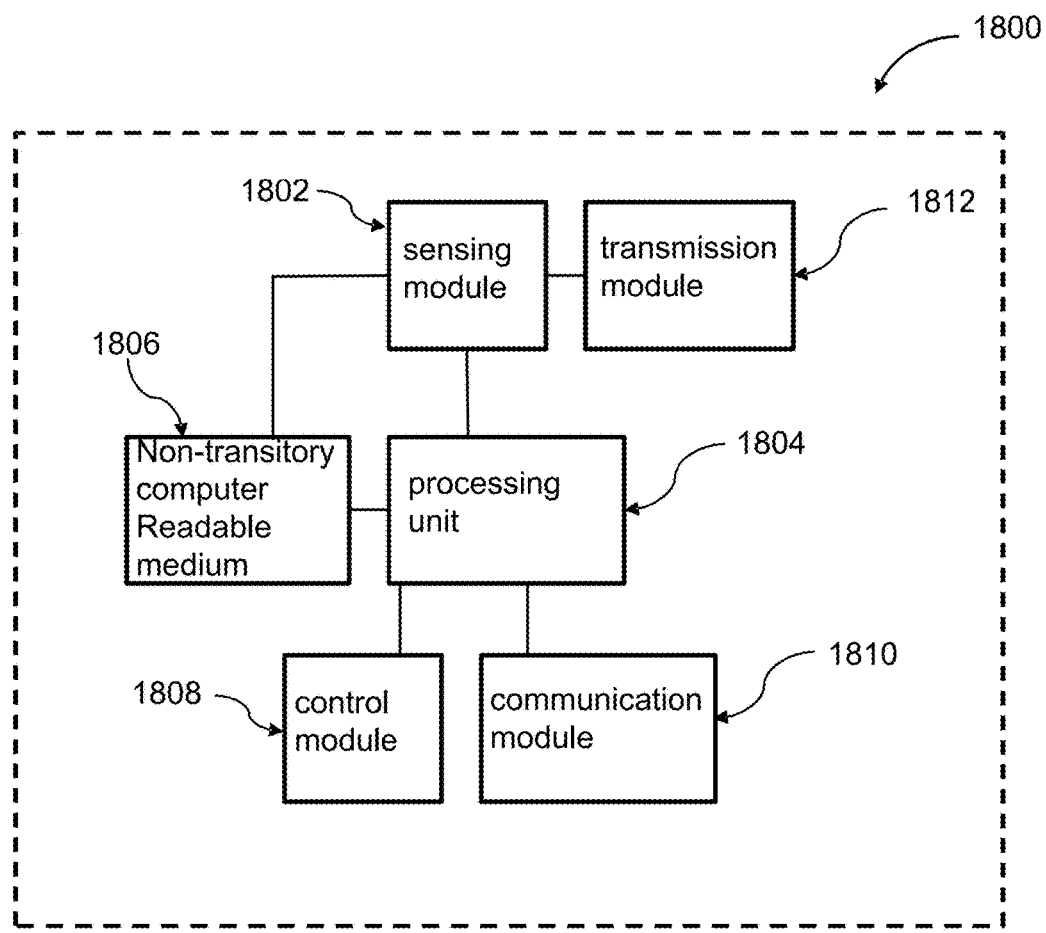
FIG. 18 is a schematic illustration by way of block diagram of a system for controlling a movable object, in accordance with an embodiment of the invention.

FIG. 18 is a schematic illustration by way of block diagram of a system 1800 for controlling a movable object, in accordance with embodiments. The system 1800 can be used in combination with any suitable embodiment of the systems, devices, and methods disclosed herein. The system 1800 can include a sensing module 1802, processing unit 1804, non-transitory computer readable medium 1806, control module 1808, and communication module 1810.

The sensing module 1802 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1802 can be operatively coupled to a processing unit 1804 having a plurality of processors. In some embodiments, the sensing module can be operatively coupled to a transmission module 1812 (e.g., a Wi-Fi image transmission module) configured to directly transmit sensing data to a suitable external device or system. For example, the transmission module 1812 can be used to transmit images captured by a camera of the sensing module 1802 to a remote terminal.

The processing unit 1804 can have one or more processors, such as a programmable processor (e.g., a central processing unit (CPU)). The processing unit 1804 can be operatively coupled to a non-transitory computer readable medium 1806. The non-transitory computer readable medium 1806 can store logic, code, and/or program instructions executable by the processing unit 1804 for performing one or more steps. The non-transitory computer readable medium can include one or more memory units (e.g., removable media or external storage such as an SD card or random access memory (RAM)). In some embodiments, data from the sensing module 1802 can be directly conveyed to and stored within the memory units of the non-transitory computer readable medium 1806. The memory units of the non-transitory computer readable medium 1806 can store logic, code and/or program instructions executable by the processing unit 1804 to perform any suitable embodiment of the methods described herein. For example, the processing unit 1804 can be configured to execute instructions causing one or more processors of the processing unit 1804 to analyze sensing data produced by the sensing module. The memory units can store sensing data from the sensing module to be processed by the processing unit 1804. In some embodiments, the memory units of the non-transitory computer readable medium 1806 can be used to store the processing results produced by the processing unit 1804.

In some embodiments, the processing unit 1804 can be operatively coupled to a control module 1808 configured to control a state of the movable object. For example, the control module 1808 can be configured to control the propulsion mechanisms of the movable object to adjust the spatial disposition, velocity, and/or acceleration of the movable object with respect to six degrees of freedom. Alternatively or in combination, the control module 1808 can control one or more of a state of a carrier, payload, or sensing module.

The processing unit 1804 can be operatively coupled to a communication module 1810 configured to transmit and/or receive data from one or more external devices (e.g., a terminal, display device, or other remote controller). Any suitable means of communication can be used, such as wired communication or wireless communication. For example, the communication module 1810 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1810 can transmit and/or receive one or more of sensing data from the sensing module 1802, processing results produced by the processing unit 1804, predetermined control data, user commands from a terminal or remote controller, and the like.

The components of the system 1800 can be arranged in any suitable configuration. For example, one or more of the components of the system 1800 can be located on the movable object, carrier, payload, terminal, sensing system, or an additional external device in communication with one or more of the above. Additionally, although FIG. 18 depicts a single processing unit 1804 and a single non-transitory computer readable medium 1806, one of skill in the art would appreciate that this is not intended to be limiting, and that the system 1800 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1800 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An unmanned aerial vehicle (UAV) comprising:
   a housing forming a central body of the UAV;
   an altitude sensor;
   a processor coupled to a memory and configured to receive sensing data from the altitude sensor; and
   a pumping system that is mounted to the central body of the UAV, the pumping system comprising:
      a pump; and
      a brushless motor, wherein the brushless motor:
         is operatively coupled to the pump and operates to effect operation of the pump; and
         is configured to drive the pump to expel spraying fluid at a first speed in response to the UAV being above a threshold altitude and at a second speed in response to the UAV being below the threshold altitude, the first speed being higher than the second speed.

2. The vehicle of claim 1, wherein the brushless motor is physically coupled to the pump.

3. The vehicle of claim 1, wherein the brushless motor and the pump form a single unit.

4. The vehicle of claim 1, wherein the pump is communicatively coupled to a sprayer.

5. The vehicle of claim 4, wherein the sprayer is a pesticide sprayer.

6. The vehicle of claim 4, wherein:
   the sprayer comprises a plurality of fluid outlets; and
   the pump is configured to expel the spraying liquid from an increased number of the plurality of fluid outlets in response to the UAV gaining altitude.

7. The vehicle of claim 1, wherein the torque and rotating speed of the brushless motor satisfies requirements of the pump.

8. The vehicle of claim 1, wherein an electronic speed controller controls the brushless motor.

9. The vehicle of claim 8, wherein the electronic speed controller is based on a field oriented control.

10. The vehicle of claim 8, wherein the electronic speed controller is integrated into the brushless motor.

11. The vehicle of claim 8, wherein the electronic speed controller controls a speed of the brushless motor.

12. The vehicle of claim 11, wherein the electronic speed controller controls the speed of the brushless motor based on calculated operating characteristics of the brushless motor.

13. The vehicle of claim 8, wherein responsiveness of the brushless motor is shorter when controlled by the electronic speed controller as compared to responsiveness of the brushless motor when not controlled by the electronic speed controller.

14. The vehicle of claim 1, wherein an electronic speed controller controls the pump.

15. The vehicle of claim 14, wherein the electronic speed controller controls a volume of fluid that is pumped through the pump.

16. The vehicle of claim 14, wherein the electronic speed controller controls a pressure of fluid that is pumped through the pump.

17. The vehicle of claim 1, further comprising a payload carried beneath the central body.

18. The vehicle of claim 17, wherein the payload is movable relative to the central body.

19. The vehicle of claim 1, wherein the brushless motor is capable of being selectively operably decoupled from the pump.

20. The vehicle of claim 1, wherein the pumping system is mounted within the housing.

* * * * *